(12) United States Patent
Kito et al.

(10) Patent No.: US 10,641,457 B2
(45) Date of Patent: May 5, 2020

(54) VEHICULAR LAMP

(71) Applicant: Koito Manufacturing Co., Ltd., Tokyo (JP)

(72) Inventors: Masanori Kito, Shizuoka (JP); Kazuya Motohashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/429,292

(22) Filed: Jun. 3, 2019

(65) Prior Publication Data

US 2019/0376659 A1   Dec. 12, 2019

(30) Foreign Application Priority Data

Jun. 6, 2018 (JP) .................. 2018-108775

(51) Int. Cl.
| | |
|---|---|
| *F21S 41/675* | (2018.01) |
| *F21S 41/14* | (2018.01) |
| *F21S 41/63* | (2018.01) |
| *F21S 41/43* | (2018.01) |
| *B60Q 1/04* | (2006.01) |
| *F21S 41/32* | (2018.01) |
| *F21S 45/40* | (2018.01) |
| *F21S 41/25* | (2018.01) |

(52) U.S. Cl.
CPC .............. *F21S 41/675* (2018.01); *B60Q 1/04* (2013.01); *F21S 41/14* (2018.01); *F21S 41/25* (2018.01); *F21S 41/321* (2018.01); *F21S 41/43* (2018.01); *F21S 41/635* (2018.01); *F21S 45/40* (2018.01)

(58) Field of Classification Search
CPC .......... F21S 41/14; F21S 41/25; F21S 41/321; F21S 41/43; F21S 41/635; F21S 41/675; F21S 45/40; B60Q 1/04
See application file for complete search history.

(56) References Cited

FOREIGN PATENT DOCUMENTS

JP          2012-146621 A      8/2012

*Primary Examiner* — Thomas M Sember
(74) *Attorney, Agent, or Firm* — Abelman, Frayne & Schwab

(57) ABSTRACT

A headlight includes light sources, and phase modulation elements that diffract lights incident from the light sources with changeable phase modulation patterns. The lights diffracted by the phase modulation elements are emitted with a low beam light distribution pattern that is a predetermined light distribution pattern based on the phase modulation patterns. A projection region on which zeroth order lights, that are emitted from the phase modulation elements without being diffracted by the phase modulation elements, among the lights incident on the phase modulation elements, are projected is located within a range where a driver's view of a vehicle is obstructed by the vehicle.

6 Claims, 11 Drawing Sheets

VEHICULAR LAMP

CROSS-REFERENCE TO RELATED APPLICATIONS

This application is based on and claims priority from Japanese Patent Application No. 2018-108775, filed on Jun. 6, 2018, with the Japan Patent Office, the disclosure of which is incorporated herein in its entirety by reference.

TECHNICAL FIELD

The present disclosure relates to a vehicular lamp, and particularly to a vehicular lamp that is reduced in size and allows easy driving.

BACKGROUND

A vehicular headlight represented by an automotive headlight is configured to irradiate at least a low beam for illuminating a front area at night. In order to form a light distribution pattern of the low beam, various configurations have been examined For example, Japanese Patent Laid-Open Publication No. 2012-146621 discloses forming a light distribution pattern of a low beam by using a hologram element as a type of diffraction grating.

SUMMARY

A vehicular headlight described in Japanese Patent Laid-Open Publication No. 2012-146621 includes a hologram element, and a light source that irradiates the hologram element with reference light. The hologram element is calculated such that first order light used for forming a light distribution pattern of a low beam illuminates a front area of a vehicle, and zeroth order light is emitted toward a front area other than the light distribution pattern of the low beam. For this reason, the above described vehicular headlight in Japanese Patent Laid-Open Publication No. 2012-146621 is considered to be capable of preventing occurrence of glare caused by the zeroth order light.

Japanese Patent Laid-Open Publication No. 2012-146621 describes that the above described vehicular headlight further includes another hologram element calculated to form a light distribution pattern of a high beam. For this reason, the vehicular headlight is considered to be capable of changing a light distribution pattern of emitted light between a light distribution pattern of a low beam and a light distribution pattern of a high beam that illuminates a distant place as compared to the low beam by switching hologram elements to be irradiated with reference light.

Meanwhile, the zeroth order light tends to have a higher light intensity than a higher-order diffracted light having a first or higher order. However, in the vehicular headlight in Japanese Patent Laid-Open Publication No. 2012-146621, the zeroth order light emitted from the hologram element is emitted toward the front area of the vehicle although the area excludes the light distribution pattern of the low beam. For this reason, in some cases, a driver's ability in attention calling may be lowered due to the zeroth order light, and thus there is a demand to make driving easier.

According to diversification of a vehicle design, etc., there is a demand for reducing the size of a vehicular headlight. Such a demand is not limited to the vehicular headlight, and is also made for a vehicular lamp including an indicating lamp, etc.

Therefore, an object of the present disclosure is to provide a vehicular lamp that is reduced in size and allows easy driving.

In order to achieve the above object, a vehicular lamp of the present disclosure includes a light source, and a phase modulator configured to diffract a light beam incident from the light source with a changeable phase modulation pattern. The light beam diffracted by the phase modulator is emitted with a predetermined light distribution pattern based on the phase modulation pattern, and a projection region on which, in the light beam incident on the phase modulator, zeroth order light beam emitted from the phase modulator without being diffracted by the phase modulator is projected is located within a range where a driver's view of a vehicle is obstructed by the vehicle.

In such a vehicular lamp, the phase modulator diffracts the light beam emitted from the light source with the changeable phase modulation pattern. Thus, by changing the phase modulation pattern, it is possible to change a light distribution pattern of the light beam diffracted by the phase modulator. Therefore, even when a plurality of light diffracting optical elements is not included, the vehicular lamp may change a light distribution pattern of emitted light, and thus may be reduced in size as compared to a vehicular lamp including a plurality of light diffracting optical elements like the vehicular headlight described in Japanese Patent Laid-Open Publication No. 2012-146621. Meanwhile, the zeroth order light beam emitted from the phase modulator tends to have a higher light intensity than a higher-order diffracted light beam having a first or higher order. However, in the vehicular lamp, since the projection region on which the zeroth order light beam is projected is located within the range where the driver's view of the vehicle is obstructed by the vehicle, it is possible to suppress the driver's ability in attention calling from being lowered due to the corresponding zeroth order light beam. For this reason, the vehicular lamp may allow easy driving as compared to that in a case where the zeroth order light beam is present in the driver's view of the vehicle. The phase modulation pattern indicates a pattern that modulates the phase of the light beam incident on the phase modulator.

The predetermined light distribution pattern may have a light intensity distribution. In this case, in a case of a light intensity distribution in which a central portion of the light distribution pattern is bright, and peripheral portions other than the corresponding central portion are relatively dark, it is possible to achieve a natural light distribution pattern that does not make the driver feel uncomfortable.

The vehicular lamp may further include a plurality of light-emitting optical systems each including one light source and one phase modulator, and an optical synthesizer configured to synthesize light beams emitted from the light-emitting optical systems, respectively. Light sources in the light-emitting optical systems may emit light beams with mutually different predetermined wavelengths, respectively, and phase modulators in the light-emitting optical systems may diffract the light beams from the light sources, respectively, such that a light beam obtained through synthesis in the optical synthesizer has the predetermined light distribution pattern.

In this case, the light beams with predetermined wavelengths, which are emitted from the light sources, are diffracted by the phase modulators in the light-emitting optical systems, respectively, so that light distribution patterns are formed. Here, since the light beams diffracted by the phase modulators are light beams with the predetermined wavelengths as described above in the light-emitting optical systems, respectively, even when the phase modulators have wavelength dependencies, it is possible to suppress the occurrence of color blurring near the edges of the light distribution patterns in the light beams emitted from the phase modulators, respectively. The light beams having the light distribution patterns in which color blurring is suppressed as described above are synthesized in the optical synthesizer, and then the predetermined light distribution pattern is formed. Therefore, in the vehicular lamp, it is possible to suppress the occurrence of color blurring near the edge of the light distribution pattern of the emitted light.

When the plurality of light-emitting optical systems is included, zeroth order light beams emitted from the phase modulators in the light-emitting optical systems, respectively, may be synthesized in the optical synthesizer and may be projected on the projection region. In this case, even when the phase modulators have wavelength dependencies as described above, the zeroth order light beams emitted from the phase modulators, respectively, may be projected to have the same color. Therefore, it is possible to suppress a pedestrian, etc. outside the vehicle from being unnecessarily conscious of the projection region on which the zeroth order light beams are projected.

The vehicular lamp of the present disclosure may include: a light source; a phase modulator configured to diffract a light beam incident from the light source with a changeable phase modulation pattern; and an optical element configured to reduce the energy density of the light beam, the optical element being disposed on an optical path of a zeroth order light beam emitted from the phase modulator without being diffracted by the phase modulator, in the light beam incident on the phase modulator, between a projection region on which the zeroth order light beam is projected and the phase modulator. The light beam diffracted by the phase modulator may be emitted with a predetermined light distribution pattern based on the phase modulation pattern.

In such a vehicular lamp, the phase modulator diffracts the light beam emitted from the light source with the changeable phase modulation pattern. Thus, by changing the phase modulation pattern, it is possible to change a light distribution pattern of the light beam diffracted by the phase modulator. Therefore, as described above, even when a plurality of light diffracting optical elements is not included, the vehicular lamp may change a light distribution pattern of emitted light, and thus may be reduced in size as compared to a vehicular lamp including a plurality of light diffracting optical elements like the vehicular headlight described in Japanese Patent Laid-Open Publication No. 2012-146621. As described above, the zeroth order light beam emitted from the phase modulator tends to have a higher light intensity than a higher-order diffracted light beam. In the vehicular lamp, the optical element that reduces the energy density of the light beam is disposed on the optical path of the zeroth order light beam between the projection region on which the zeroth order light beam is projected and the phase modulator. Therefore, even when the light intensity of the zeroth order light beam is higher than the light intensity of the light beam diffracted by the phase modulator, among the light beams emitted from the phase modulators, the energy density of the zeroth order light beam may be reduced by the optical element. For this reason, it is possible to suppress the projection region of the zeroth order light beam from becoming significantly brighter than the predetermined light distribution pattern by the light beam diffracted by the phase modulator. Accordingly, the vehicular lamp may allow easy driving as compared to that in a case where the optical element that reduces the energy density of the light beam is not included.

When the optical element that reduces the energy density of the light beam is included, the vehicular lamp may further include a casing accommodating the light sources and the phase modulators, and the optical element may be disposed within the casing. In this case, it is possible to suppress the zeroth order light beam from being emitted to the outside of the vehicle as compared to that in a case where the optical element is disposed outside the casing. Therefore, it is possible to suppress the projection region of the zeroth order light beam from being significantly bright outside the vehicle, and as a result, it is possible to suppress a driver, a pedestrian, etc. from being unnecessarily conscious of the projection region.

When the optical element that reduces the energy density of the light beam is included, the optical element may be a light shielding element, or a light diffusing element. For this reason, in the vehicular lamp, it is possible to select the light shielding element or the light diffusing element as the optical element according to the type of vehicle on which the corresponding vehicular lamp is mounted, etc.

When the optical element that reduces the energy density of the light beam is included, the projection region may be located outside the predetermined light distribution pattern. That is, the predetermined light distribution pattern may be a light distribution pattern in which the projection region is located outside the corresponding predetermined light distribution pattern. In this case, it is possible to suppress a part of the predetermined light distribution pattern from becoming significantly bright as compared to that in a case where the projection region is located within the predetermined light distribution pattern, and as a result, easier driving is possible.

When the optical element that reduces the energy density of the light beam is included, the predetermined light distribution pattern has a predetermined light intensity distribution, and the projection region may be included within a region where the light intensity is below half the highest light intensity in the light intensity distribution of the light beam diffracted by the phase modulator in the predetermined light distribution pattern. In this case, as compared to that in a case where the projection region is included in a region where the light intensity is higher than half the highest light intensity in the light intensity distribution of the light beam diffracted by the phase modulator, the light intensity distribution of the light distribution pattern formed by the light beam diffracted by the phase modulator and the zeroth order light beam easily becomes a smooth light intensity distribution with reference to a position with the highest light intensity in the light intensity distribution of the light beam diffracted by the phase modulator.

When the optical element that reduces the energy density of the light beam is included, the vehicular lamp may include a plurality of light-emitting optical systems each of which includes one light source and one phase modulator, and may further include an optical synthesizer configured to synthesize light beams emitted from the light-emitting optical systems, respectively. Light sources in the light-emitting optical systems may emit light beams with mutually different predetermined wavelengths, respectively, and phase modulators in the light-emitting optical systems may diffract the light beams from the light sources, respectively, such that light obtained through synthesis in the optical synthesizer has the predetermined light distribution pattern.

In this case, the light beams with predetermined wavelengths, which are emitted from the light sources, are diffracted by the phase modulators in the light-emitting optical systems, respectively, so that light distribution patterns are formed. Here, since the light beams diffracted by the phase modulators are light beams with the predetermined wavelengths as described above in the light-emitting optical systems, respectively, even when the phase modulators have wavelength dependencies, it is possible to suppress the occurrence of color blurring near the edges of the light distribution patterns in the light beams emitted from the phase modulators, respectively. The light beams having the light distribution patterns in which color blurring is suppressed as described above are synthesized in the optical synthesizer, and then the predetermined light distribution pattern is formed. Therefore, in the vehicular lamp, it is possible to suppress the occurrence of color blurring near the edge of the light distribution pattern of the emitted light beam.

When the optical element that reduces the energy density of the light beam is included, zeroth order light beams emitted from the phase modulators in the light-emitting optical systems, respectively, may be synthesized in the optical synthesizer, and the optical element may reduce the energy density of a zeroth order light beam obtained through synthesis in the optical synthesizer.

In this case, as compared to that in a case where the zeroth order light beams emitted from the phase modulators in the light-emitting optical systems, respectively, are not synthesized, it is possible to reduce an illumination region of the light illuminating the optical element. Therefore, it is possible to suppress the energy density of the light beam diffracted by the phase modulator among light beams emitted from the phase modulators, from being reduced by the optical element.

The vehicular lamp of the present disclosure may include: a light source; and a phase modulator configured to diffract a light beam incident from the light source with a changeable phase modulation pattern. A light distribution pattern having a predetermined light intensity distribution based on the phase modulation pattern may be formed by the light beam diffracted by the phase modulator, and a zeroth order light beam that is emitted from the phase modulator without being diffracted by the phase modulator. A projection region on which the zeroth order light beam is projected may be located within a region where the light intensity is higher than half the highest light intensity in the light intensity distribution of the light beam diffracted by the phase modulator, in the light distribution pattern. That is, the light distribution pattern of the light beam diffracted by the phase modulator may be a light distribution pattern in which the projection region is located within a region where the light intensity is higher than half the highest light intensity in the light intensity distribution in the corresponding light distribution pattern.

In such a vehicular lamp, the phase modulator diffracts the light beam emitted from the light source with the changeable phase modulation pattern. For this reason, by changing the phase modulation pattern, it is possible to change a light distribution pattern of the light beam diffracted by the phase modulator, and to change a light distribution pattern formed by the light beam diffracted by the phase modulator and the zeroth order light beam. Therefore, even when a plurality of light diffracting optical elements is not included, the vehicular lamp may change a light distribution pattern of emitted light, and thus may be reduced in size as compared to a vehicular lamp including a plurality of light diffracting optical elements like the vehicular headlight described in Japanese Patent Laid-Open Publication No. 2012-146621. As described above, the zeroth order light beam emitted from the phase modulator tends to have a higher light intensity than a higher-order diffracted light beam. In the vehicular lamp, the projection region on which the zeroth order light beam is projected is located within a region where the light intensity is higher than half the highest light intensity in the light intensity distribution of the light beam diffracted by the phase modulator that is a light beam corresponding to a higher-order diffracted light beam. For this reason, it is possible to suppress the projection region on which the zeroth order light beam is projected from becoming significantly bright in the light distribution pattern. Therefore, the vehicular lamp may allow easy driving as compared to that in a case where the projection region is disposed outside the region where the light intensity is higher than half the highest light intensity in the light intensity distribution of the light beam diffracted by the phase modulator.

When the projection region on which the zeroth order light beam is projected is located within the region where the light intensity is higher than half the highest light intensity in the light intensity distribution of the light beam diffracted by the phase modulator, it is desirable that the projection region is located avoiding a portion with the highest light intensity in the light intensity distribution. That is, it is desirable that the light distribution pattern of the light beam diffracted by the phase modulator is a light distribution pattern in which the projection region is located avoiding a portion with the highest light intensity in the light intensity distribution in the corresponding light distribution pattern. In this case, it is possible to suppress the portion with the highest light intensity from being excessively bright in the light intensity distribution of the light beam diffracted by the phase modulator.

When the projection region on which the zeroth order light beam is projected is located within the region where the light intensity is higher than half the highest light intensity in the light intensity distribution of the light beam diffracted by the phase modulator, it is desirable that the region is a hot zone in the light distribution pattern. That is, it is desirable that the light distribution pattern of the light beam diffracted by the phase modulator is a light distribution pattern in which a region where the light intensity is higher than half the highest light intensity in the light intensity distribution of the corresponding light distribution pattern is a hot zone in the light distribution pattern formed by the light beam diffracted by the phase modulator and the zeroth order light beam. In this case, while the zeroth order light beam is used to form the light distribution pattern, it is possible to suppress the projection region from being significantly bright in the corresponding light distribution pattern.

When the projection region on which the zeroth order light beam is projected is located within the region where the light intensity is higher than half the highest light intensity in the light intensity distribution of the light beam diffracted by the phase modulator, the vehicular lamp may include a plurality of light-emitting optical systems each of which includes one light source and one phase modulator, and may further include an optical synthesizer that synthesizes light beams emitted from the light-emitting optical systems, respectively. Light sources in the light-emitting optical systems may emit light beams with mutually different predetermined wavelengths, respectively, and phase modulators in the light-emitting optical systems may emit the light beams from the light sources, respectively, such that light obtained through synthesis in the optical synthesizer has the light distribution pattern.

In this case, the light beams with predetermined wavelengths, which are emitted from the light sources, are diffracted by the phase modulators in the light-emitting optical systems, respectively, so that light distribution patterns are formed. Here, since the light beams diffracted by the phase modulators are light beams with the predetermined wavelengths as described above in the light-emitting optical systems, respectively, even when the phase modulators have wavelength dependencies, it is possible to suppress the occurrence of color blurring near the edges of the light distribution patterns in the light beams emitted from the phase modulators, respectively. The light beams having the light distribution patterns in which color blurring is suppressed as described above are synthesized in the optical synthesizer, and then a light distribution pattern having a predetermined light intensity distribution is formed. Therefore, in the vehicular lamp, it is possible to suppress the occurrence of color blurring near the edge of the light distribution pattern of the emitted light.

When the projection region on which the zeroth order light beam is projected is located within the region where the light intensity is higher than half the highest light intensity in the light intensity distribution of the light beam diffracted by the phase modulator, zeroth order light beams emitted from the phase modulators in the light-emitting optical systems, respectively, may be synthesized in the optical synthesizer and may be projected on the projection region. In this case, even when the phase modulators have wavelength dependencies as described above, the zeroth order light beams emitted from the phase modulators, respectively, may be projected to have the same color. Therefore, it is possible to suppress a driver, etc. from being unnecessarily conscious of the projection region on which the zeroth order light beams are projected.

The vehicular lamp of the present disclosure may include: a light source; and a phase modulator configured to diffract a light beam incident from the light source with a changeable phase modulation pattern. A light distribution pattern having a predetermined light intensity distribution based on the phase modulation pattern may be formed by the light beam diffracted by the phase modulator, and a zeroth order light beam that is emitted from the phase modulator without being diffracted by the phase modulator. In a projection region on which the zeroth order light beam is projected in the light distribution pattern, the light intensity of the light that is diffracted by the phase modulator and illuminates the projection region may be lower than the light intensity of the light that illuminates the outer edge of the projection region. That is, the phase modulator may diffract the light beam incident from the light source such that the light intensity of the light that is diffracted by the phase modulator and illuminates the projection region is lower than the light intensity of the light that illuminates the outer edge of the projection region.

In such a vehicular lamp, the phase modulator diffracts the light beam emitted from the light source with the changeable phase modulation pattern. For this reason, by changing the phase modulation pattern, it is possible to change a light distribution pattern of the light beam diffracted by the phase modulator, and to change a light distribution pattern formed by the light beam diffracted by the phase modulator and the zeroth order light beam. Therefore, even when a plurality of light diffracting optical elements is not included, the vehicular lamp may change a light distribution pattern of emitted light, and thus may be reduced in size as compared to a vehicular lamp including a plurality of light diffracting optical elements like the vehicular headlight described in Japanese Patent Laid-Open Publication No. 2012-146621. As described above, the zeroth order light beam emitted from the phase modulator tends to have a higher light intensity than a higher-order diffracted light. In the vehicular lamp, in the projection region on which the zeroth order light beam is projected, the light intensity of the light beam diffracted by the phase modulator that is light corresponding to higher-order diffracted light is lower than the light intensity of the light illuminating the outer edge of the projection region. For this reason, it is possible to suppress the projection region on which the zeroth order light beam is projected from becoming significantly bright in the light distribution pattern. Therefore, the vehicular lamp may allow easy driving as compared to that in a case where in the projection region, the light intensity of the light beam diffracted by the phase modulator is equal to or higher than the light intensity of the light illuminating the outer edge of the projection region.

When in the projection region on which the zeroth order light beam is projected, the light intensity of the light beam diffracted by the phase modulator is lower than the light intensity of the light illuminating the outer edge of the projection region, the sum of the light intensity of the light that is diffracted by the phase modulator and illuminates the projection region and the light intensity of the zeroth order light beam may be lower than the highest light intensity in the light intensity distribution of the light beam diffracted by the phase modulator. That is, the phase modulator may diffract the light beam incident from the light source such that the sum of the light intensity of the light that is diffracted by the phase modulator and illuminates the projection region and the light intensity of the zeroth order light beam is lower than the highest light intensity in the light intensity distribution of the light beam diffracted by the phase modulator. In this case, as compared to that in a case where the sum of the light intensity of the light that is diffracted by the phase modulator and illuminates the projection region and the light intensity of the zeroth order light beam is equal to or higher than the highest light intensity in the light intensity distribution of the light beam diffracted by the phase modulator, the light intensity distribution of the light distribution pattern easily becomes a smooth light intensity distribution with reference to a position with the highest light intensity in the light intensity distribution of the light beam diffracted by the phase modulator.

When in the projection region on which the zeroth order light beam is projected, the light intensity of the light beam diffracted by the phase modulator is lower than the light intensity of the light illuminating the outer edge of the projection region, the light intensity of the light that is diffracted by the phase modulator and illuminates the projection region may be zero. That is, the phase modulator may diffract the light beam incident from the light source such that the light intensity of the light that is diffracted by the phase modulator and illuminates the projection region becomes zero. In this case, even when the difference between the light intensity of the zeroth order light beam and the light intensity of the light beam diffracted by the phase modulator is large, it is possible to suppress the projection region on which the zeroth order light beam is projected from becoming significantly bright in the light distribution pattern, and thus the light intensity distribution of the corresponding light distribution pattern easily becomes a smooth light intensity distribution.

When in the projection region on which the zeroth order light beam is projected, the light intensity of the light beam diffracted by the phase modulator is lower than the light intensity of the light illuminating the outer edge of the projection region, the projection region may be included within a region where the light intensity is higher than half the highest light intensity in the light intensity distribution of the light beam diffracted by the phase modulator. That is, the phase modulator may diffract the light beam incident from the light source such that the projection region is included within a region where the light intensity is higher than half the highest light intensity in the light intensity distribution of the light beam diffracted by the phase modulator. In this case, as compared to that in a case where the projection region on which the zeroth order light beam is projected is included in a region where the light intensity is below half the highest light intensity in the light intensity distribution of the light beam diffracted by the phase modulator, it is possible to suppress the projection region on which the zeroth order light beam is projected from becoming significantly bright in the light distribution pattern.

When in the projection region on which the zeroth order light beam is projected, the light intensity of the light beam diffracted by the phase modulator is lower than the light intensity of the light illuminating the outer edge of the projection region, the projection region may include a position with the highest light intensity in the light intensity distribution of the light beam diffracted by the phase modulator. That is, the phase modulator may diffract the light beam incident from the light source such that the projection region includes a position with the highest light intensity in the light intensity distribution of the light beam diffracted by the phase modulator. In this case, regardless of whether the light intensity of the zeroth order light beam is high, the brightest region in the light distribution pattern substantially does not change. For this reason, the light intensity distribution of the light distribution pattern easily becomes a smoother light intensity distribution with reference to a position with the highest light intensity in the light intensity distribution of the light beam diffracted by the phase modulator.

When in the projection region on which the zeroth order light beam is projected, the light intensity of the light beam diffracted by the phase modulator is lower than the light intensity of the light illuminating the outer edge of the projection region, the vehicular lamp may include a plurality of light-emitting optical systems each of which includes one light source and one phase modulator, and may further include an optical synthesizer that synthesizes light beams emitted from the light-emitting optical systems, respectively. Light sources in the light-emitting optical systems may emit light beams with mutually different predetermined wavelengths, respectively, and phase modulators in the light-emitting optical systems may emit the light beams from the light sources, respectively, such that light obtained through synthesis in the optical synthesizer has the light distribution pattern.

In this case, the light beams with predetermined wavelengths, which are emitted from the light sources, are diffracted by the phase modulators in the light-emitting optical systems, respectively, so that light distribution patterns are formed. Here, since the light beams diffracted by the phase modulators are light beams with the predetermined wavelengths as described above in the light-emitting optical systems, respectively, even when the phase modulators have wavelength dependencies, it is possible to suppress the occurrence of color blurring near the edges of the light distribution patterns in the light beams emitted from the phase modulators, respectively. The light beams having the light distribution patterns in which color blurring is suppressed as described above are synthesized in the optical synthesizer, and then a light distribution pattern is formed. Therefore, in the vehicular lamp, it is possible to suppress the occurrence of color blurring near the edge of the light distribution pattern of the emitted light.

When in the projection region on which the zeroth order light beam is projected, the light intensity of the light beam diffracted by the phase modulator is lower than the light intensity of the light illuminating the outer edge of the projection region, zeroth order light beams emitted from the phase modulators in the light-emitting optical systems, respectively, may be synthesized in the optical synthesizer, and then may illuminate the projection region. In this case, even when the phase modulators have wavelength dependencies as described above, the zeroth order light beams emitted from the phase modulators, respectively, may be projected to have the same color. Therefore, it is possible to suppress a driver, etc. from being unnecessarily conscious of the projection region on which the zeroth order light beams are projected.

When in the projection region on which the zeroth order light beam is projected, the light intensity of the light beam diffracted by the phase modulator is lower than the light intensity of the light illuminating the outer edge of the projection region, the vehicular lamp may include a plurality of light-emitting optical systems each of which includes one light source and one phase modulator. Light sources in the light-emitting optical systems may emit light beams with mutually different predetermined wavelengths, respectively, and phase modulators in the light-emitting optical systems may emit the light beams from the light sources, respectively, such that the light distribution pattern is made at a position away from the vehicle by a predetermined distance. In this case, since the optical synthesizer is not included, a simple configuration may be made.

According to the vehicular lamp of the present disclosure as described above, it is possible to realize a vehicular lamp that is reduced in size and allows easy driving.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

First Embodiment

Figure 1:
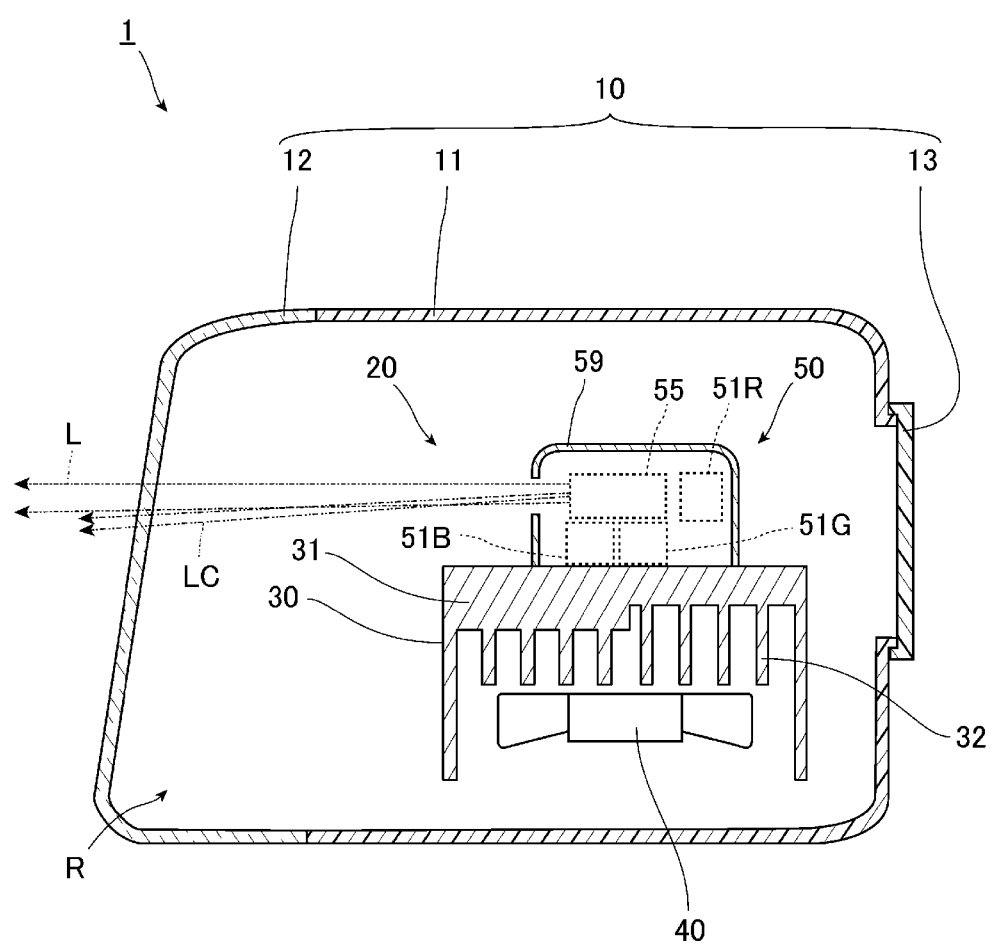
FIG. 1 is a view illustrating a vehicular lamp in a first embodiment of the present disclosure.

FIG. 1 is a view illustrating a vehicular lamp in the embodiment, and is a view schematically illustrating a vertical cross-section of the vehicular lamp. The vehicular lamp of the embodiment is a headlight 1 for an automobile, and includes a casing 10, and a lamp unit 20 as a main configuration as illustrated in FIG. 1.

The casing 10 includes a lamp casing 11, a front cover 12, and a back cover 13 as main constitutional elements. The front side of the lamp casing 11 is open, and the front cover 12 is fixed to the lamp casing 11 so as to cover the corresponding opening. A small opening is formed at the rear side of the lamp casing 11 as compared to that at the front side, and the back cover 13 is fixed to the lamp casing 11 so as to cover the corresponding opening.

A space formed by the lamp casing 11, the front cover 12 covering the opening at the front side of the corresponding lamp casing 11, and the back cover 13 covering the opening at the rear side of the corresponding lamp casing 11 is a lamp chamber R. The lamp unit 20 is accommodated within the lamp chamber R.

The lamp unit 20 of the embodiment includes a heat sink 30, a cooling fan 40, and an optical system unit 50, as main constitutional elements, and is fixed to the casing 10 through a configuration (not illustrated).

The heat sink 30 has a metallic base plate 31 extending in a substantially horizontal direction, and a plurality of heat dissipation fins 32 is provided on the bottom surface side of the corresponding base plate 31 so as to be integrated with the base plate 31. The cooling fan 40 is disposed with a gap from the heat dissipation fins 32, and is fixed to the heat sink 30. The heat sink 30 is cooled by an air flow caused by the rotation of the cooling fan 40.

The optical system unit 50 is disposed on the top surface of the base plate 31 in the heat sink 30. The optical system unit 50 includes a first light-emitting optical system 51R, a second light-emitting optical system 51G, a third light-emitting optical system 51B, a synthesis optical system 55, and a cover 59.

Figure 2:
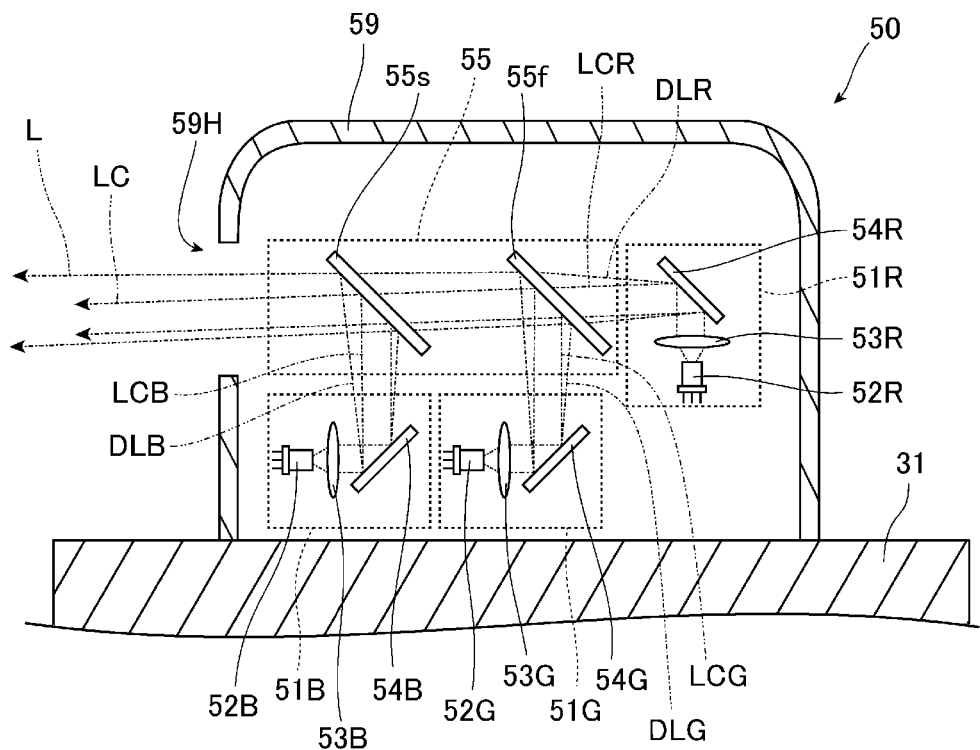
FIG. 2 is a view of an optical system unit in FIG. 1, in an enlarged scale.

FIG. 2 is a view of the optical system unit illustrated in FIG. 1, in an enlarged scale. As illustrated in FIG. 2, the first light-emitting optical system 51R includes a light source 52R, a collimator lens 53R, and a phase modulation element 54R. The light source 52R is a laser element that emits laser light with a predetermined wavelength, and emits red laser light with a peak power wavelength of, for example, 638 nm in the embodiment. The optical system unit 50 has a circuit board (not illustrated), and the light source 52R is mounted on the corresponding circuit board so that power is supplied via the circuit board.

The collimator lens 53R is a lens that collimates the fast axis direction and the slow axis direction of the laser light emitted from the light source 52R. Instead of the collimator lens 53R, a collimator lens that collimates the fast axis direction of the laser light and a collimator lens that collimates the slow axis direction may be individually provided.

The phase modulation element 54R is configured to be capable of diffracting and emitting incident light, and changing a light distribution pattern of the emitted light or a region to be irradiated with the emitted light. The phase modulation element 54R of the embodiment is a reflection-type phase modulation element that diffracts and emits incident light while reflecting the incident light, and is, for example, a liquid crystal on silicon (LCOS) that is a reflection-type liquid crystal panel. The red laser light emitted from the collimator lens 53R is incident on the phase modulation element 54R, and the phase modulation element 54R diffracts and emits the red laser light.

The light diffracted by the phase modulation element 54R is higher-order diffracted light having a first or higher order. Besides the corresponding higher-order diffracted light, zeroth order light is emitted from the phase modulation element 54R, which is reflected by the corresponding phase modulation element 54R without being diffracted by the phase modulation element 54R. That is, the light emitted from the phase modulation element 54R includes the higher-order diffracted light that is a light component diffracted by the phase modulation element 54R, and the zeroth order light that is a light component that is reflected by the phase modulation element 54R without being diffracted by the phase modulation element 54R. In this manner, from the first light-emitting optical system 51R, a first light DLR as red higher-order diffracted light is emitted and a first zeroth order light LCR as red zeroth order light is emitted.

The second light-emitting optical system 51G includes a light source 52G, a collimator lens 53G, and a phase modulation element 54G, and the third light-emitting optical system 51B includes a light source 52B, a collimator lens 53B, and a phase modulation element 54B. Each of the light sources 52G and 52B is a laser element that emits laser light with a predetermined wavelength. In the embodiment, the light source 52G emits green laser light with a peak power wavelength of, for example, 515 nm, and the light source 52B emits blue laser light with a peak power wavelength of, for example, 445 nm. Each of the light sources 52G and 52B is mounted on the above described circuit board so that power is supplied via the corresponding circuit board.

The collimator lens 53G is a lens that collimates the fast axis direction and the slow axis direction of the laser light emitted from the light source 52G, and the collimator lens 53B is a lens that collimates the fast axis direction and the slow axis direction of the laser light emitted from the light source 52B. Instead of each of these collimator lenses 53G and 53B, a collimator lens that collimates the fast axis direction of the laser light and a collimator lens that collimates the slow axis direction may be individually provided.

Similarly to the phase modulation element 54R, each of the phase modulation element 54G and the phase modulation element 54B is configured to be capable of diffracting and emitting incident light and changing a light distribution pattern of the emitted light or a region to be irradiated with the emitted light. Each of these phase modulation elements 54G and 54B is, for example, an LCOS that is a reflection-type liquid crystal panel. The green laser light emitted from the collimator lens 53G is incident on the phase modulation element 54G, and the phase modulation element 54G diffracts and emits the green laser light. The blue laser light emitted from the collimator lens 53B is incident on the phase modulation element 54B, and the phase modulation element 54B diffracts and emits the blue laser light.

Similarly to the above described phase modulation element 54R, the light diffracted by the phase modulation element 54G is higher-order diffracted light having a first or higher order. Besides the corresponding higher-order diffracted light, zeroth order light is emitted from the phase modulation element 54G, which is reflected by the corresponding phase modulation element 54G without being diffracted by the phase modulation element 54G. That is, the light emitted from the phase modulation element 54G includes the higher-order diffracted light that is a light component diffracted by the phase modulation element 54G, and the zeroth order light that is a light component that is reflected by the phase modulation element 54G without being diffracted by the phase modulation element 54G. In this manner, from the second light-emitting optical system 51G, a second light DLG as green higher-order diffracted light is emitted, and a second zeroth order light LCG as green zeroth order light is emitted.

Similarly to the above described phase modulation elements 54R and 54G, the light diffracted by the phase modulation element 54B is higher-order diffracted light having a first or higher order. Besides the corresponding higher-order diffracted light, zeroth order light is emitted from the phase modulation element 54B, which is reflected by the corresponding phase modulation element 54B without being diffracted by the phase modulation element 54B. That is, the light emitted from the phase modulation element 54B includes the higher-order diffracted light that is a light component diffracted by the phase modulation element 54B, and the zeroth order light that is a light component that is reflected by the phase modulation element 54B without being diffracted by the phase modulation element 54B. In this manner, from the third light-emitting optical system 51B, a third light DLB as blue higher-order diffracted light is emitted, and a third zeroth order light LCB as blue zeroth order light is emitted. Therefore, in the embodiment, the wavelength of the first light DLR is the longest, and the wavelength becomes shorter in the order of the second light DLG and the third light DLB. Likewise, the wavelength of the first zeroth order light LCR is the longest, and the wavelength becomes shorter in the order of the second zeroth order light LCG and the third zeroth order light LCB.

The synthesis optical system 55 includes a first optical element 55$f$ and a second optical element 55$s$. The first optical element 55$f$ is an optical element that synthesizes the first light DLR emitted from the first light-emitting optical system 51R, and the second light DLG emitted from the second light-emitting optical system 51G. The first optical element 55$f$ is also an optical element that synthesizes the first zeroth order light LCR emitted from the first light-emitting optical system 51R, and the second zeroth order light LCG emitted from the second light-emitting optical system 51G. In the embodiment, the first optical element 55$f$ synthesizes the first light DLR and the second light DLG by transmitting the first light DLR and reflecting the second light DLG, and synthesizes the first zeroth order light LCR and the second zeroth order light LCG by transmitting the first zeroth order light LCR and reflecting the second zeroth order light LCG.

The second optical element 55$s$ is an optical element that synthesizes the first light DLR and the second light DLG which are synthesized by the first optical element 55$f$, and the third light DLB emitted from the third light-emitting optical system 51B. The second optical element 55$s$ is also an optical element that synthesizes the first zeroth order light LCR and the second zeroth order light LCG which are synthesized by the first optical element 55$f$, and the third zeroth order light LCB emitted from the third light-emitting optical system 51B. In the embodiment, the second optical element 55$s$ synthesizes the first light DLR, the second light DLG, and the third light DLB by transmitting the first light DLR and the second light DLG synthesized by the first optical element 55$f$ and reflecting the third light DLB. The second optical element 55$s$ synthesizes the first zeroth order light LCR, the second zeroth order light LCG, and the third zeroth order light LCB by transmitting the first zeroth order light LCR and the second zeroth order light LCG synthesized by the first optical element 55$f$ and reflecting the third zeroth order light LCB.

As the first optical element 55$f$ and the second optical element 55$s$ as described above, a wavelength selective filter in which an oxide film is laminated on a glass substrate may be exemplified. In this configuration, by controlling the type or the thickness of the oxide film, it is possible to transmit light with a wavelength longer than a predetermined wavelength, and to reflect light with a wavelength shorter than the predetermined wavelength.

In this manner, the synthesis optical system 55 emits light obtained by synthesizing the first light DLR, the second light DLG, and the third light DLB, and light obtained by synthesizing the first zeroth order light LCR, the second zeroth order light LCG, and the third zeroth order light LCB.

The cover 59 is fixed on the base plate 31 of the heat sink 30. The cover 59 has a substantially rectangular shape, and is made of, for example, a metal such as aluminum. In a space within the cover 59, the first light-emitting optical system 51R, the second light-emitting optical system 51G, the third light-emitting optical system 51B, and the synthesis optical system 55 as described above are disposed. An opening 59H through which the light emitted from the synthesis optical system 55 is transmittable is formed at the front side of the cover 59. It is desirable that the inner wall of the cover 59 is light-absorbing due to a black anodizing processing, etc. By making the inner wall of the cover 59 light-absorbing, light that has illuminated the inner wall of the cover 59 due to unintended reflection or refraction, etc.

may be suppressed from being reflected and emitted from the opening 59H in an unintended direction.

Subsequently, configurations of the phase modulation element 54R, the phase modulation element 54G, and the phase modulation element 54B will be described in detail.

In the embodiment, the phase modulation element 54R, the phase modulation element 54G, and the phase modulation element 54B have the same configurations. For this reason, hereinafter, the phase modulation element 54R will be described, and descriptions on the phase modulation element 54G and the phase modulation element 54B will be appropriately omitted.

Figure 3:
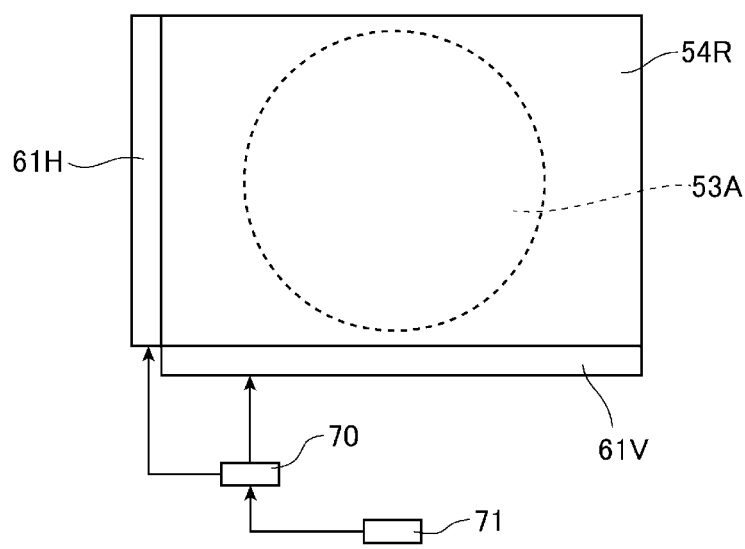
FIG. 3 is a front view of a phase modulation element illustrated in FIG. 2.

FIG. 3 is a front view of the phase modulation element illustrated in FIG. 2. In FIG. 3, a region 53A on which the laser light emitted from the collimator lens 53R is incident is illustrated by a broken line. The phase modulation element 54R has a rectangular outer shape, and includes a plurality of modulation units arranged in a matrix shape within the corresponding rectangle. Each of the modulation units diffracts and emits light incident on the corresponding modulation unit. Each of the modulation units includes a plurality of dots arranged in a matrix shape. The modulation units are formed such that one or more modulation units are located within the region 53A on which the laser light emitted from the collimator lens 53R is incident. As illustrated in FIG. 3, a scanning line drive circuit 61H is disposed on the lateral side of the phase modulation element 54R, and a data line drive circuit 61V is disposed on one side in the vertical direction of the phase modulation element 54R.

Figure 4:
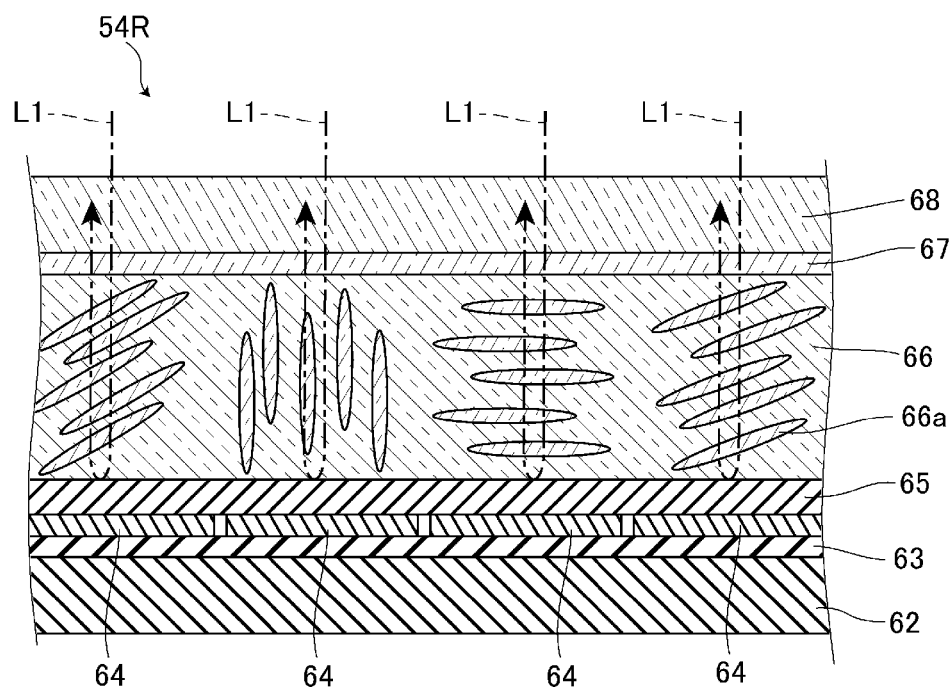
FIG. 4 is a view schematically illustrating a cross-section of a part of the phase modulation element illustrated in FIG. 3 in the thickness direction.

FIG. 4 is a view schematically illustrating a cross-section of a part of the phase modulation element illustrated in FIG. 3 in the thickness direction. As illustrated in FIG. 4, the phase modulation element 54R of the embodiment includes a silicon substrate 62, a drive circuit layer 63, a plurality of electrodes 64, a reflective film 65, a liquid crystal layer 66, a transparent electrode 67, and a translucent substrate 68, as a main configuration.

The plurality of electrodes 64 is arranged in a matrix shape on one surface side of the silicon substrate 62 while corresponding to the dots of the modulation unit, respectively. Each dot includes the electrode 64. The drive circuit layer 63 is a layer in which circuits connected to the scanning line drive circuit 61H and the data line drive circuit 61V illustrated in FIG. 3 are disposed, and is disposed between the silicon substrate 62 and the plurality of electrodes 64. The translucent substrate 68 is disposed to face the silicon substrate 62 on one side of the corresponding silicon substrate 62, and is, for example, a glass substrate. The transparent electrode 67 is disposed on the surface of the translucent substrate 68 on the silicon substrate 62 side. The liquid crystal layer 66 includes liquid crystal molecules 66a, and is disposed between the plurality of electrodes 64 and the transparent electrode 67. The reflective film 65 is disposed between the plurality of electrodes 64 and the liquid crystal layer 66, and is, for example, a dielectric multilayer film. The laser light emitted from the collimator lens 53R is incident from the surface of the translucent substrate 68 opposite to the silicon substrate 62 side.

As illustrated in FIG. 4, light L1, which is incident from the surface of the translucent substrate 68 opposite to the silicon substrate 62 side, passes through the transparent electrode 67 and the liquid crystal layer 66 and is reflected by the reflective film 65, and then passes through the liquid crystal layer 66 and the transparent electrode 67 and is emitted from the translucent substrate 68. Here, when a voltage is applied between a specific electrode 64 and the transparent electrode 67, the orientation of the liquid crystal molecules 66a of the liquid crystal layer 66 located between the corresponding electrode 64 and the transparent electrode 67 is changed, and the refractive index of the liquid crystal layer 66 located between the corresponding electrode 64 and the transparent electrode 67 is changed. Since the orientation of the liquid crystal molecules 66a changes according to the applied voltage, the refractive index also changes according to the voltage. Since the optical path length of the light L1 passing through the liquid crystal layer 66 changes according to the change of the refractive index of the corresponding liquid crystal layer 66, it is possible to change the phase of the light that passes through the corresponding liquid crystal layer 66 and is emitted from the phase modulation element 54R. As described above, the plurality of electrodes 64 is arranged corresponding to the dots of the modulation unit, respectively, and thus, each change amount of the phase of light emitted from each dot is adjusted by controlling the voltage applied between the electrode 64 corresponding to each dot and the transparent electrode 67. In this manner, by adjusting the refractive index of the liquid crystal layer 66 in each dot, the phase modulation element 54R may diffract and emit incident light and make a light distribution pattern of the emitted light a desired light distribution pattern. By changing the refractive index of the liquid crystal layer 66 in each dot, the phase modulation element 54R may change a light distribution pattern of the emitted light or change the direction of the emitted light so as to change a region to be irradiated with the light.

As illustrated in FIG. 3, a controller 70 is electrically connected to the scanning line drive circuit 61H and the data line drive circuit 61V of the phase modulation element 54R. The controller 70 controls the refractive index of the liquid crystal layer 66 in each dot. As in the phase modulation element 54R, the controller 70 is also electrically connected to a scanning line drive circuit and a data line drive circuit (not illustrated) in each of the phase modulation elements 54G and 54B, and also controls the refractive index of a liquid crystal layer in each dot in each of these phase modulation elements 54G and 54B. The controller 70 performs such a control on the basis of a signal, etc. input to the controller 70 from the outside. In the embodiment, the controller 70 is electrically connected to a control device 71, etc. of an automobile, such as an electronic control device (ECU).

In the embodiment, the same phase modulation patterns are formed in the modulation units, respectively, in the phase modulation element 54R. Also, the same phase modulation patterns are formed in the modulation units, respectively, in the phase modulation element 54G, and the same phase modulation patterns are formed in the modulation units, respectively, in the phase modulation element 54B. In the present specification, the phase modulation pattern indicates a pattern that modulates the phase of incident light. In the embodiment, it may be understood that the phase modulation pattern is a pattern of the refractive index of the liquid crystal layer 66 in each dot, and is also a pattern of the voltage applied between the electrode 64 corresponding to each dot and the transparent electrode 67. That is, the phase modulation element 54R diffracts the incident light with a changeable phase modulation pattern, and the light distribution pattern of the light diffracted by the corresponding phase modulation element 54R becomes a light distribution pattern based on the phase modulation pattern. Then, by adjusting the phase modulation pattern, the light distribution pattern of the light diffracted by the corresponding phase modulation element 54R may be made as a desired light distribution pattern. In the embodiment, the respective phase modulation patterns in the phase modulation elements 54R, 54G, and 54B are mutually different phase modulation patterns.

Specifically, in the embodiment, the respective phase modulation patterns in the phase modulation elements 54R, 54G, and 54B are phase modulation patterns that diffract the laser lights emitted from the collimator lenses 53R, 53G, and 53B, respectively, such that light, which is obtained by synthesizing the lights DLR, DLG, and DLB as the higher-order diffracted lights emitted from the phase modulation elements 54R, 54G, and 54B, respectively, in the synthesis optical system 55, has the light distribution pattern of the low beam L. That is, the phase modulation elements 54R, 54G, and 54B diffract the laser lights emitted from the collimator lenses 53R, 53G, and 53B, respectively, such that light, which is obtained by synthesizing the lights DLR, DLG, and DLB as the higher-order diffracted lights emitted from the phase modulation elements 54R, 54G, and 54B, respectively, in the synthesis optical system 55, has the light distribution pattern of the low beam L. The light distribution pattern also includes a light intensity distribution. For this reason, in the embodiment, the light DLR emitted from the phase modulation element 54R has the same outer shape as the outer shape of the light distribution pattern of the low beam L, and has a light intensity distribution based on the light intensity distribution of the light distribution pattern of the low beam L. The light DLG emitted from the phase modulation element 54G has the same outer shape as the outer shape of the light distribution pattern of the low beam L, and has a light intensity distribution based on the light intensity distribution of the light distribution pattern of the low beam L. The light DLB emitted from the phase modulation element 54B has the same outer shape as the outer shape of the light distribution pattern of the low beam L, and has a light intensity distribution based on the light intensity distribution of the light distribution pattern of the low beam L. As described above, each of these phase modulation elements 54R, 54G, and 54B includes the plurality of modulation units that forms the same phase modulation patterns, and each modulation unit diffracts the laser light emitted from each of the collimator lenses 53R, 53G, and 53B such that such a light distribution pattern is made. In this manner, the phase modulation element 54R emits the light DLR as a red component of the light distribution pattern of the low beam L, the phase modulation element 54G emits the light DLG as a green component of the light distribution pattern of the low beam L, and the phase modulation element 54B emits the light DLB as a blue component of the light distribution pattern of the low beam L.

The above described light intensity distribution based on the light intensity distribution of the light distribution pattern of the low beam L means that in a portion of the light distribution pattern of the low beam L where the light intensity is high, the light intensity of each of the lights DLR, DLG, and DLB emitted from each of the phase modulation elements 54R, 54G, and 54B is also high.

As described above, from the phase modulation elements 54R, 54G, and 54B, the zeroth order lights LCR, LCG, and LCB are also emitted. In the embodiment, the phase modulation elements 54R, 54G, and 54B emit the zeroth order lights LCR, LCG, and LCB, respectively, such that a projection region on which a zeroth order light beam LC is projected is located within a predetermined range below the light distribution pattern of the low beam L. The zeroth order light beam LC is obtained by synthesizing the zeroth order lights LCR, LCG, and LCB emitted from the corresponding phase modulation elements 54R, 54G, and 54B, respectively, in the synthesis optical system 55. For example, the phase modulation elements 54R, 54G, and 54B only have to diffract the laser lights emitted from the collimator lenses 53R, 53G, and 53B, respectively, such that the lights DLR, DLG, and DLB as the higher-order diffracted lights are emitted while being shifted upward with respect to the direction of the zeroth order lights LCR, LCG, and LCB emitted from the phase modulation elements 54R, 54G, and 54B.

In this manner, the phase modulation element 54R emits the zeroth order light LCR as a red component in the zeroth order light beam LC together with the light DLR, the phase modulation element 54G emits the zeroth order light LCG as a green component in the zeroth order light beam LC together with the light DLG, and the phase modulation element 54B emits the zeroth order light LCB as a blue component in the zeroth order light beam LC together with the light DLB.

Next, descriptions will be made on emission of light by the headlight 1 of the embodiment.

First, when power is supplied from a power supply (not illustrated), laser light is emitted from each of the light sources 52R, 52G, and 52B. As described above, red laser light is emitted from the light source 52R, green laser light is emitted from the light source 52G, and blue laser light is emitted from the light source 52B. The laser lights are collimated by the collimator lenses 53R, 53G, and 53B, respectively, and then are incident on the phase modulation elements 54R, 54G, and 54B, respectively. Each of the phase modulation elements 54R, 54G, and 54B diffracts the laser light incident on each of the corresponding phase modulation elements 54R, 54G, and 54B. As described above, the phase modulation element 54R emits the first light DLR that is light of a red component of the light distribution pattern of the low beam L, and the zeroth order light LCR that is light of a red component of the zeroth order light beam LC. The phase modulation element 54G emits the second light DLG that is light of a green component of the light distribution pattern of the low beam L, and the zeroth order light LCG that is light of a green component of the zeroth order light beam LC. The phase modulation element 54B emits the third light DLB that is light of a blue component of the light distribution pattern of the low beam L, and the zeroth order light LCB that is light of a blue component of the zeroth order light beam LC. In this manner, the first light DLR and the first zeroth order light LCR are emitted from the first light-emitting optical system 51R, the second light DLG and the second zeroth order light LCG are emitted from the second light-emitting optical system 51G, and the third light DLB and the third zeroth order light LCB are emitted from the third light-emitting optical system 51B.

In the synthesis optical system 55, first, by the first optical element 55$f$, the first light DLR and the second light DLG are synthesized, and the first zeroth order light LCR and the second zeroth order light LCG are synthesized. The first light DLR and the second light DLG synthesized by the first optical element 55$f$ are synthesized with the third light DLB by the second optical element 55$s$. The first zeroth order light LCR and the second zeroth order light LCG synthesized by the first optical element 55$f$ are synthesized with the third zeroth order light LCB by the second optical element 55$s$. In the embodiment, the outer shape of each of the lights DLR, DLG, and DLB is the same as the outer shape of the low beam L, and thus the respective outer shapes of the lights DLR, DLG, and DLB are synthesized while matching each other. The respective outer shapes of the zeroth order lights LCR, LCG, and LCB are the same outer shapes, and thus, the respective outer shapes of the zeroth order lights LCR, LCG, and LCB are synthesized while matching each other. That is, the position of each of the light-emitting optical systems or the synthesis optical system is finely adjusted such that the outer shape of the first light DLR, the outer shape of the second light DLG, and the outer shape of the third light DLB, and the outer shape of the first zeroth order light LCR, the outer shape of the second zeroth order light LCG, and the outer shape of the third zeroth order light LCB are synthesized in the synthesis optical system as described above.

In this manner, light obtained by synthesizing the first red light DLR, the second green light DLG, and the third blue light DLB becomes white light. Each of the first light DLR, the second light DLG, and the third light DLB has the same outer shape as the outer shape of the light distribution pattern of the low beam L as described above, and has a light intensity distribution based on the light intensity distribution of the light distribution pattern of the low beam L. Thus, the white light obtained by synthesizing these lights has the light intensity distribution of the low beam L.

In this manner, the white light obtained by synthesizing the first light DLR, the second light DLG, and the third light DLB is emitted from the opening 59H of the cover 59, and this light is emitted from the headlight 1 through the front cover 12. Since this light has the light distribution pattern of the low beam L, the emitted light becomes the low beam L.

Figure 5:
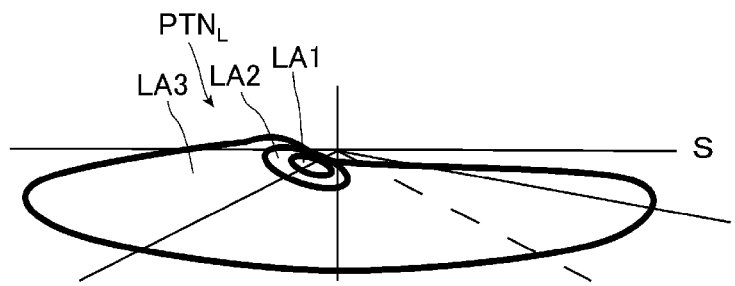
FIG. 5 is a view illustrating a light distribution pattern of a low beam.

FIG. 5 is a view illustrating the light distribution pattern of the low beam in the embodiment. In FIG. 5, S indicates a horizontal line, and the light distribution pattern is indicated by a thick line. In the light distribution pattern $PTN_L$ of the low beam L, a first region LA1 is a region with the highest light intensity, and the light intensity decreases in the order of a second region LA2, and a third region LA3. That is, each of the phase modulation elements 54R, 54G, and 54B diffracts light such that synthesized light forms the light distribution pattern including the light intensity distribution of the low beam L.

Light obtained by synthesizing the first zeroth order light LCR of a red color, the second zeroth order light LCG of a green color, and the third zeroth order light LCB of a blue color becomes the zeroth order light beam LC of a white color. The zeroth order light beam LC is emitted from the opening 59H of the cover 59, and this light is emitted from the headlight 1 through the front cover 12 toward the front lower side of the vehicle and is projected on the projection region below the light distribution pattern of the low beam L.

Figure 6:
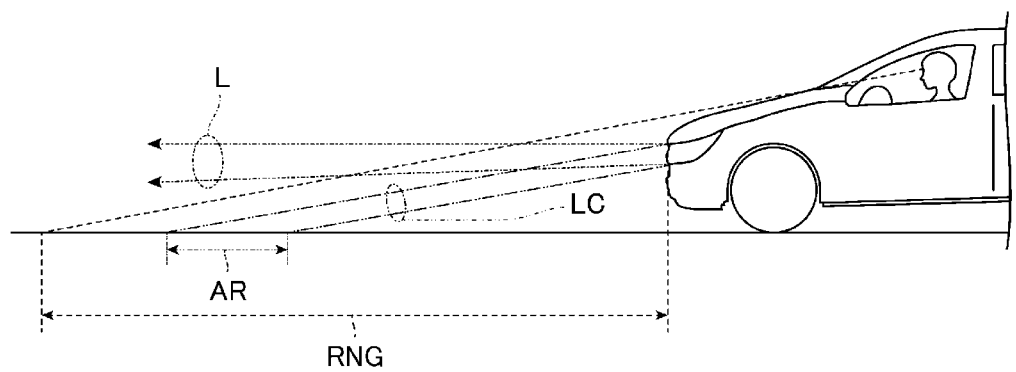
FIG. 6 is a view illustrating a projection region of zeroth order light.

FIG. 6 is a view illustrating the projection region of the zeroth order light. As illustrated in FIG. 6, a projection region AR of the embodiment is located within a range RNG where the driver's view of the automobile is obstructed by a hood of the automobile. That is, the projection region AR is located within the range RNG which is a blind spot of the driver of the automobile. In the range RNG which is a blind spot of the driver of the automobile, the road surface illuminance in a region other than the projection region AR of the zeroth order light is about 5 lux or less.

As described above, each of the phase modulation elements 54R, 54G, and 54B diffracts the incident light with the changeable phase modulation pattern, and the light distribution pattern of the light diffracted by each of the phase modulation elements 54R, 54G, and 54B becomes a light distribution pattern based on the phase modulation pattern. For this reason, by changing the phase modulation pattern, the headlight 1 may change the light distribution pattern of the light diffracted by each of the phase modulation elements 54R, 54G, and 54B, and may change the light distribution pattern of the emitted light. By adjusting each of the phase modulation patterns in the phase modulation elements 54R, 54G, and 54B, for example, a light distribution pattern $PTN_H$ of a high beam illustrated in FIG. 7 may be formed. In the light distribution pattern $PTN_H$ of the high beam illustrated in FIG. 7, a region HA1 is a region with the highest light intensity, and a region HA2 is a region having a lower light intensity than the region HA1.

Specifically, the respective phase modulation patterns in the phase modulation elements 54R, 54G, and 54B are changed into phase modulation patterns that diffract the laser lights emitted from the collimator lenses 53R, 53G, and 53B, respectively, such that light, which is obtained by synthesizing the higher-order diffracted lights emitted from the phase modulation elements 54R, 54G, and 54B, respectively, in the synthesis optical system 55, has the light distribution pattern $PTN_H$ of the high beam. By changing the phase modulation patterns in this manner, each of the lights diffracted by the phase modulation elements 54R, 54G, and 54B has the same outer shape as the outer shape of the light distribution pattern of the high beam, and has a light intensity distribution based on the light intensity distribution of the light distribution pattern of the high beam. In the same manner as in the low beam, these lights are synthesized in the synthesis optical system 55 and emitted from the corresponding synthesis optical system 55. Then, the light distribution pattern is changed from the light distribution pattern $PTN_L$ of the low beam L into the light distribution pattern $PTN_H$ of the high beam. The zeroth order lights LCR, LCG, and LCB emitted from the phase modulation elements 54R, 54G, and 54B are lights which are reflected by the phase modulation elements 54R, 54G, and 54B without being diffracted by the phase modulation elements 54R, 54G, and 54B as described above. For this reason, the position of the projection region AR on which the zeroth order lights are projected is hardly changed on the basis of a change of the phase modulation patterns. Then, in the embodiment, even if the light distribution pattern of the emitted light is changed into the light distribution pattern $PTN_H$ of the high beam in this manner, the zeroth order lights LCR, LCG, and LCB are projected on the projection region AR below the light distribution pattern $PTN_L$ of the low beam L.

As described above, the headlight 1 of the embodiment includes the light sources 52R, 52G, and 52B, and the phase modulation elements 54R, 54G, and 54B that diffract lights incident from the light sources 52R, 52G, and 52B with changeable phase modulation patterns.

In the headlight 1 of the embodiment, the phase modulation elements 54R, 54G, and 54B diffract the lights emitted from the light sources 52R, 52G, and 52B, respectively, with changeable phase modulation patterns. For this reason, by changing the phase modulation patterns, the light distribution patterns of the lights diffracted by the phase modulation elements 54R, 54G, and 54B may be changed, and the headlight 1 may change the light distribution pattern of the emitted light.

The projection region AR, on which the zeroth order lights emitted from the phase modulation elements 54R, 54G, and 54B without being diffracted by the corresponding phase modulation elements 54R, 54G, and 54B among the lights incident on the phase modulation elements 54R, 54G, and 54B are projected, is located within the range RNG where the driver's view of the automobile is obstructed by the automobile.

Therefore, the headlight 1 of the embodiment may suppress the driver's ability in attention calling from being lowered due to the zeroth order light having a higher light intensity than the higher-order diffracted light having a first or higher order. For this reason, the headlight 1 of the embodiment may allow easy driving as compared to that in a case where the zeroth order light is present in the driver's view of the automobile.

Figure 7:
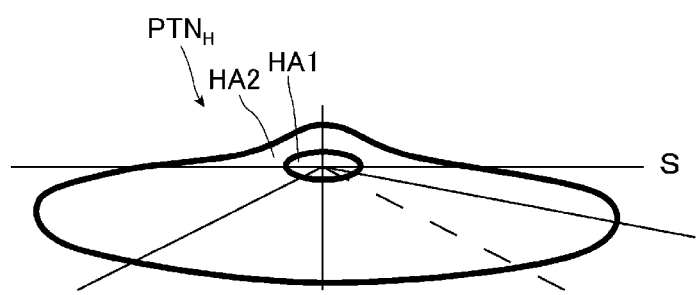
FIG. 7 is a view illustrating a light distribution pattern of a high beam.

In the headlight 1 of the embodiment, the lights diffracted by the phase modulation elements 54R, 54G, and 54B are emitted as the light distribution pattern $PTN_L$ of the low beam L or the light distribution pattern $PTN_H$ of the high beam on the basis of the phase modulation patterns in the phase modulation elements 54R, 54G, and 54B, in the embodiment. As illustrated in FIGS. 5 and 7, each of the light distribution pattern $PTN_L$ of the low beam L and the light distribution pattern $PTN_H$ of the high beam has a light intensity distribution in which a central portion of the light distribution pattern is bright and peripheral portions other than the corresponding central portion are relatively dark. For this reason, the headlight 1 of the embodiment may emit a natural light distribution pattern that does not make the driver feel uncomfortable.

The headlight 1 of the embodiment may form a light distribution pattern $PTN_L$ of a low beam L without using a shade, and thus, may be reduced in size as compared to that in a vehicular lamp using a shade.

The headlight 1 of the embodiment includes a plurality of light-emitting optical systems each of which includes one light source and one phase modulation element. Specifically, the headlight 1 includes the first light-emitting optical system 51R including one light source 52R and one phase modulation element 54R, the second light-emitting optical system 51G including one light source 52G and one phase modulation element 54G, and the third light-emitting optical system 51B including one light source 52B and one phase modulation element 54B. Besides, the headlight 1 of the embodiment further includes the synthesis optical system 55 that synthesizes lights emitted from the light-emitting optical systems 51R, 51G, and 51B, respectively. Then, the light sources 52R, 52G, and 52B emit lights with mutually different predetermined wavelengths, respectively, and the phase modulation elements 54R, 54G, and 54B diffract the lights from the light sources 52R, 52G, and 52B, respectively, such that light obtained through synthesis in the synthesis optical system 55 has a light distribution pattern $PTN_L$ of a low beam L.

In this case, the lights with predetermined wavelengths, which are emitted from the light sources 52R, 52G, and 52B, respectively, are diffracted by the phase modulation elements 54R, 54G, and 54B so that light distribution patterns are formed. Here, the lights DLR, DLG, and DLB diffracted by the phase modulation elements 54R, 54G, and 54B have predetermined wavelengths, in the light-emitting optical systems 51R, 51G, and 51B, respectively. For this reason, even when the phase modulation elements 54R, 54G, and 54B have wavelength dependencies, it is possible to suppress the occurrence of color blurring near the edges of the light distribution patterns in the lights DLR, DLG, and DLB emitted from the phase modulation elements 54R, 54G, and 54B, respectively. The lights DLR, DLG, and DLB having the light distribution patterns in which color blurring is suppressed as described above are synthesized in the synthesis optical system 55, and then, the light distribution pattern $PTN_L$ of the low beam L is formed. Therefore, in the headlight 1 of the embodiment, it is possible to suppress the occurrence of color blurring near the edge of the light distribution pattern $PTN_L$ of the emitted low beam L.

In the headlight 1 of the embodiment, the zeroth order lights LCR, LCG, and LCB emitted from the phase modulation elements 54R, 54G, and 54B, respectively, are synthesized in the synthesis optical system 55 and projected on the projection region AR. In this case, even when the phase modulation elements 54R, 54G, and 54B have wavelength dependencies as described above, the zeroth order lights LCR, LCG, and LCB emitted from the phase modulation elements 54R, 54G, and 54B, respectively, may be projected to have the same white color. Therefore, in the headlight 1 of the embodiment, it is possible to suppress a pedestrian etc. outside the vehicle from being unnecessarily conscious of the projection region AR on which the zeroth order lights LCR, LCG, and LCB are projected.

Second Embodiment

Hereinafter, a second embodiment of the present disclosure will be described in detail with reference to FIGS. 8 and 9. Constitutional elements which are the same or similar as/to those in the first embodiment are denoted by the same reference numerals and redundant descriptions thereof will be omitted except a case where descriptions are made in particular.

Figure 8:
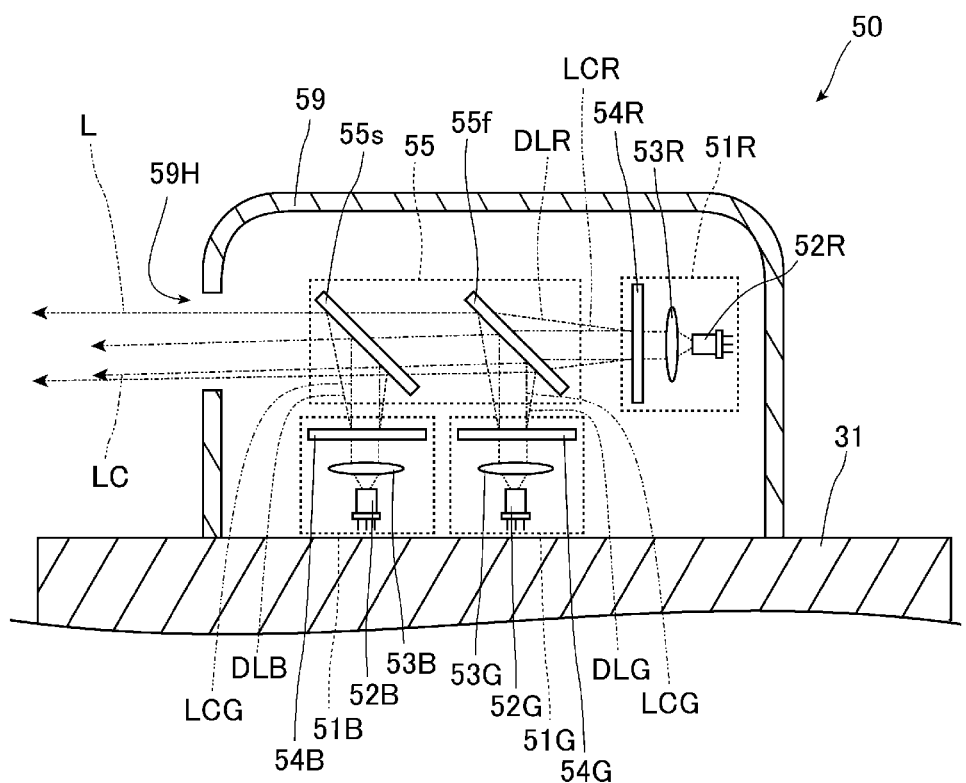
FIG. 8 is a view illustrating an optical system unit in a second embodiment of the present disclosure in the same manner as in FIG. 2.

FIG. 8 is a view illustrating an optical system unit in the second embodiment of the present disclosure in the same manner as in FIG. 2. FIG. 9 is a view schematically illustrating a cross-section of a part of a phase modulation element illustrated in FIG. 8 in the thickness direction. As illustrated in FIGS. 8 and 9, the optical system unit 50 of the embodiment is different from the optical system unit 50 of the first embodiment in that each of the phase modulation elements 54R, 54G, and 54B is mainly a transmission-type phase modulation element that diffracts and emits incident light while transmitting the incident light.

In the embodiment, these phase modulation elements 54R, 54G, and 54B are, for example, liquid crystal displays (LCDs) which are transmission-type liquid crystal panels. A red laser light emitted from the collimator lens 53R is incident on the phase modulation element 54R, and the phase modulation element 54R diffracts and emits the red laser light. The light diffracted by the phase modulation element 54R is higher-order diffracted light having a first or higher order. Besides the corresponding higher-order diffracted light, zeroth order light is emitted from the phase modulation element 54R, which is transmitted straight through the phase modulation element 54R without being diffracted by the corresponding phase modulation element 54R. That is, the light emitted from the phase modulation element 54R includes the higher-order diffracted light that is a light component diffracted by the phase modulation element 54R, and the zeroth order light that is a light component that is transmitted straight through the phase modulation element 54R without being diffracted by the phase modulation element 54R. In this manner, from the first light-emitting optical system 51R, a first light DLR as red higher-order diffracted light is emitted and a first zeroth order light LCR as red zeroth order light is emitted.

A green laser light emitted from the collimator lens 53G is incident on the phase modulation element 54G, and the phase modulation element 54G diffracts and emits the green laser light. The light diffracted by the phase modulation element 54G is higher-order diffracted light having a first or higher order. Besides the corresponding higher-order diffracted light, zeroth order light is emitted from the phase modulation element 54G, which is transmitted straight through the phase modulation element 54G without being diffracted by the corresponding phase modulation element 54G. That is, the light emitted from the phase modulation element 54G includes the higher-order diffracted light that is a light component diffracted by the phase modulation element 54G, and the zeroth order light that is a light component that is transmitted straight through the phase modulation element 54G without being diffracted by the phase modulation element 54G. In this manner, from the second light-emitting optical system 51G, a second light DLG as green higher-order diffracted light is emitted and a second zeroth order light LCG as green zeroth order light is emitted.

A blue laser light emitted from the collimator lens 53B is incident on the phase modulation element 54B, and the phase modulation element 54B diffracts and emits the blue laser light. The light diffracted by the phase modulation element 54B is higher-order diffracted light having a first or higher order. Besides the corresponding higher-order diffracted light, zeroth order light is emitted from the phase modulation element 54B, which is transmitted straight through the phase modulation element 54B without being diffracted by the corresponding phase modulation element 54B. That is, the light emitted from the phase modulation element 54B includes the higher-order diffracted light that is a light component diffracted by the phase modulation element 54B, and the zeroth order light that is a light component that is transmitted straight through the phase modulation element 54B without being diffracted by the phase modulation element 54B. In this manner, from the third light-emitting optical system 51B, a third light DLB as blue higher-order diffracted light is emitted, and a third zeroth order light LCB as blue zeroth order light is emitted.

Next, configurations of the phase modulation element 54R, the phase modulation element 54G, and the phase modulation element 54B of the embodiment will be described in detail. In the embodiment, the phase modulation element 54R, the phase modulation element 54G, and the phase modulation element 54B have the same configurations. For this reason, hereinafter, the phase modulation element 54R will be described, and descriptions on the phase modulation element 54G and the phase modulation element 54B will be appropriately omitted.

Like the phase modulation element 54R of the first embodiment, the phase modulation element 54R of the embodiment has a rectangular outer shape, and includes a plurality of modulation units arranged in a matrix shape within the corresponding rectangle. Each of the modulation units includes a plurality of dots arranged in a matrix shape. The modulation units are formed such that one or more modulation units are located within a region on which the laser light emitted from the collimator lens 53R is incident. A scanning line drive circuit is disposed on the lateral side of the phase modulation element 54R, and a data line drive circuit is disposed on one side in the vertical direction of the phase modulation element 54R.

Figure 9:
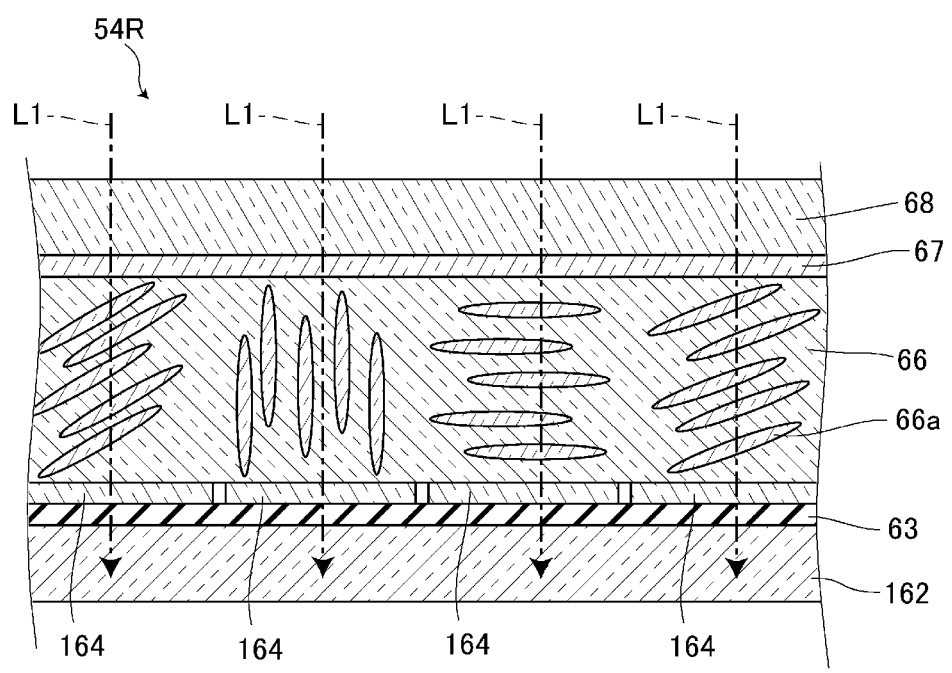
FIG. 9 is a view schematically illustrating a cross-section of a part of a phase modulation element illustrated in FIG. 8 in the thickness direction.

As illustrated in FIG. 9, the phase modulation element 54R of the embodiment is different from the phase modulation element 54R of the first embodiment in that the phase modulation element 54R mainly includes a translucent substrate 162 instead of the silicon substrate 62, includes a plurality of transparent electrodes 164 instead of the plurality of electrodes 64, and does not include the reflective film 65. Then, the phase modulation element 54R of the embodiment includes a pair of translucent substrates 162 and 68, the drive circuit layer 63, the plurality of transparent electrodes 164, the liquid crystal layer 66, and the transparent electrode 67, as a main configuration.

The plurality of transparent electrodes 164 is arranged in a matrix shape on one surface side of one translucent substrate 162, while corresponding to the dots of the modulation unit, respectively. Each dot includes the transparent electrode 164. The drive circuit layer 63 is a layer in which circuits connected to the scanning line drive circuit and the data line drive circuit are disposed, and is disposed between the translucent substrate 162 and the plurality of transparent electrodes 164. The other translucent substrate 68 is disposed to face one translucent substrate 162 on one surface side of the corresponding one translucent substrate 162. The transparent electrode 67 is disposed on the surface of the other translucent substrate 68 on one translucent substrate 162 side. The liquid crystal layer 66 includes the liquid crystal molecules 66a, and is disposed between the plurality of transparent electrodes 164 and the transparent electrode 67. Then, in the embodiment, the laser light emitted from the collimator lens 53R is incident from the surface of the other translucent substrate 68 opposite to one translucent substrate 162 side.

As illustrated in FIG. 9, light L1, which is incident from the surface of the other translucent substrate 68 opposite to one translucent substrate 162 side, passes through the transparent electrode 67, the liquid crystal layer 66, the transparent electrodes 164, and one translucent substrate 162, and is emitted from the surface of one translucent substrate 162 opposite to the other translucent substrate 68 side. When a voltage is applied between a specific transparent electrode 164 and the transparent electrode 67, the orientation of the liquid crystal molecules 66a of the liquid crystal layer 66 located between the corresponding transparent electrode 164 and the transparent electrode 67 is changed, and the refractive index of the liquid crystal layer 66 located between the corresponding transparent electrode 164 and the transparent electrode 67 is changed. Since the orientation of the liquid crystal molecules 66a changes according to the applied voltage, the refractive index also changes according to the voltage. Since the optical path length of the light L1 passing through the liquid crystal layer 66 as described above changes according to the change of the refractive index of the corresponding liquid crystal layer 66, it is possible to change the phase of the light that passes through the corresponding liquid crystal layer 66 and is emitted from the phase modulation element 54R. The plurality of transparent electrodes 164 is arranged corresponding to the dots of the modulation unit, respectively, and thus, each change amount of the phase of light emitted from each dot is adjusted by controlling the voltage applied between the transparent electrode 164 corresponding to each dot and the transparent electrode 67. By adjusting the refractive index of the liquid crystal layer 66 in each dot, the phase modulation element 54R of the embodiment may diffract and emit incident light and make a light distribution pattern of the emitted light a desired light distribution pattern, like the phase modulation element 54R of the first embodiment. By changing the refractive index of the liquid crystal layer 66 in each dot, the phase modulation element 54R of the embodiment may change a light distribution pattern of the emitted light or change the direction of the emitted light so as to change a region to be irradiated with the light. When light is incident from one translucent substrate 162 side, the phase modulation element 54R emits the light from the other translucent substrate 68. In this case as well, by adjusting the refractive index of the liquid crystal layer 66 in each dot, the phase modulation element 54R may make a light distribution pattern of the emitted light a desired light distribution pattern. In this case as well, by changing the refractive index of the liquid crystal layer 66 in each dot, the phase modulation element 54R may change a light distribution pattern of the emitted light or change the direction of the emitted light so as to change a region to be irradiated with the light. That is, in the same manner as in the phase modulation element 54R of the first embodiment, the phase modulation element 54R of the embodiment diffracts the incident light with a changeable phase modulation pattern, and the light distribution pattern of the light diffracted by the corresponding phase modulation element 54R becomes a light distribution pattern based on the phase modulation pattern. Then, by adjusting the phase modulation pattern, it is possible to make the light distribution pattern of the light diffracted by the corresponding phase modulation element 54R a desired light distribution pattern.

In the embodiment, as in the first embodiment, the same phase modulation patterns are formed in the modulation units, respectively, in the phase modulation element 54R. Also, the same phase modulation patterns are formed in the modulation units, respectively, in the phase modulation element 54G, and the same phase modulation patterns are formed in the modulation units, respectively, in the phase modulation element 54B. The phase modulation patterns in these phase modulation elements 54R, 54G, and 54B, respectively, are mutually different phase modulation patterns.

Specifically, in the embodiment as well, as in the first embodiment, the respective phase modulation patterns in the phase modulation elements 54R, 54G, and 54B are phase modulation patterns that diffract the laser lights emitted from the collimator lenses 53R, 53G, and 53B, respectively, such that light, which is obtained by synthesizing the lights DLR, DLG, and DLB as the higher-order diffracted lights emitted from the phase modulation elements 54R, 54G, and 54B, respectively, in the synthesis optical system 55, has a light distribution pattern $PTN_L$ of a low beam L.

The phase modulation elements 54R, 54G, and 54B emit the zeroth order lights LCR, LCG, and LCB such that a projection region on which a zeroth order light beam LC, which is obtained by synthesizing the zeroth order lights LCR, LCG, and LCB emitted from the corresponding phase modulation elements 54R, 54G, and 54B, respectively, in the synthesis optical system 55, is projected is located within a predetermined range below the light distribution pattern $PTN_L$ of the low beam L.

For this reason, the phase modulation element 54R emits the zeroth order light LCR as a red component in the zeroth order light beam LC together with the light DLR as a red component in the light distribution pattern $PTN_L$ of the low beam L. The phase modulation element 54G emits the zeroth order light LCG as a green component in the zeroth order light beam LC together with the light DLG as a green component in the light distribution pattern $PTN_L$ of the low beam L. The phase modulation element 54B emits the zeroth order light LCB as a blue component in the zeroth order light beam LC together with the light DLB as a blue component in the light distribution pattern $PTN_L$ of the low beam L.

In the embodiment, as in the first embodiment, the light DLR emitted from the phase modulation element 54R has the same outer shape as the outer shape of the light distribution pattern $PTN_L$ of the low beam L, and has a light intensity distribution based on the light intensity distribution of the light distribution pattern $PTN_L$ of the low beam L. The light DLG emitted from the phase modulation element 54G has the same outer shape as the outer shape of the light distribution pattern $PTN_L$ of the low beam L, and has a light intensity distribution based on the light intensity distribution of the light distribution pattern $PTN_L$ of the low beam L. The light DLB emitted from the phase modulation element 54B has the same outer shape as the outer shape of the light distribution pattern $PTN_L$ of the low beam L, and has a light intensity distribution based on the light intensity distribution of the light distribution pattern $PTN_L$ of the low beam L. Outer shapes of the zeroth order lights LCR, LCG, and LCB emitted from the phase modulation elements 54R, 54G, and 54B, respectively, are the same outer shapes.

The lights DLR, DLG, and DLB, which are the higher-order diffracted lights emitted from the phase modulation elements 54R, 54G, and 54B, respectively, are synthesized in the synthesis optical system 55, and the synthesized light becomes white light. This light is emitted from the opening 59H of the cover 59, and is emitted from the headlight 1 through the front cover 12. Since this light has the light distribution pattern $PTN_L$ of the low beam, the emitted light becomes the low beam L.

The zeroth order lights LCR, LCG, and LCB emitted from the phase modulation elements 54R, 54G, and 54B, respectively, are synthesized in the synthesis optical system 55, and the synthesized light becomes the zeroth order light beam LC of a white color. The zeroth order light beam LC is emitted from the opening 59H of the cover 59, and this light is emitted from the headlight 1 through the front cover 12 toward the front lower side of the vehicle, and is projected on a projection region AR below the light distribution pattern $PTN_L$ of the low beam L. The projection region AR is located within a range RNG where the driver's view of the automobile is obstructed by a hood of the automobile.

In the headlight 1 of the embodiment, as in the headlight 1 of the first embodiment, since the zeroth order light having a higher light intensity than the higher-order diffracted light is emitted within the range RNG which is a blind spot of the driver of the automobile, it is possible to suppress the driver's ability in attention calling from being lowered.

In the headlight 1 of the embodiment, as in the first embodiment, the phase modulation elements 54R, 54G, and 54B diffract the lights emitted from the light sources 52R, 52G, and 52B, respectively, with changeable phase modulation patterns. For this reason, the headlight 1 may change the light distribution pattern of the emitted light.

Third Embodiment

Next, a third embodiment of the present disclosure will be described in detail with reference to FIG. 10. Constitutional elements which are the same or similar as/to those in the second embodiment are denoted by the same reference numerals and redundant descriptions thereof will be omitted except a case where descriptions are made in particular.

Figure 10:
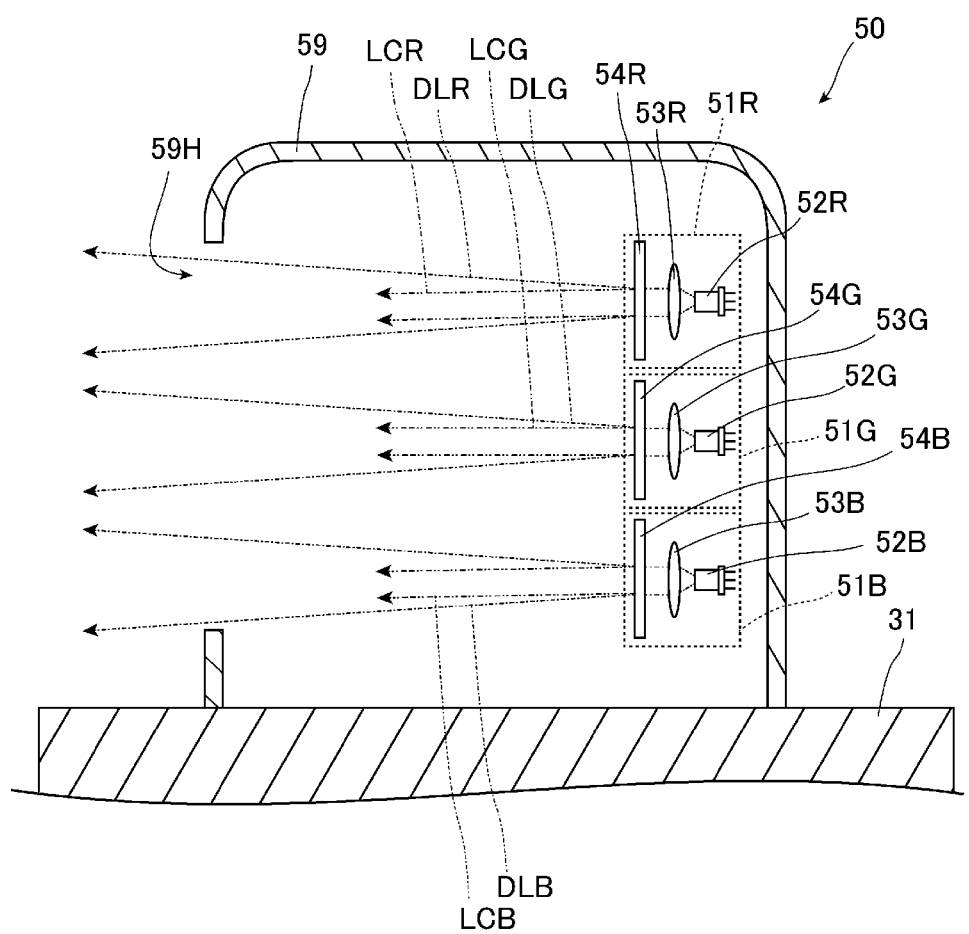
FIG. 10 is a view illustrating an optical system unit in a third embodiment of the present disclosure in the same manner as in FIG. 2.

FIG. 10 is a view illustrating an optical system unit in the third embodiment of the present disclosure in the same manner as in FIG. 2. As illustrated in FIG. 10, the optical system unit 50 of the embodiment is different from the optical system unit 50 of the second embodiment in that the optical system unit 50 does not include the synthesis optical system 55, and light is emitted from the cover 59 in a state where respective lights emitted from the first light-emitting optical system 51R, the second light-emitting optical system 51G, and the third light-emitting optical system 51B are not synthesized. In the embodiment, light emission directions of the first light-emitting optical system 51R, the second light-emitting optical system 51G, and the third light-emitting optical system 51B are on the opening 59H side of the cover 59.

In the embodiment as well, as in the second embodiment, the phase modulation elements 54R, 54G, and 54B diffract laser lights emitted from the collimator lenses 53R, 53G, and 53B, respectively, such that light, which is obtained by synthesizing lights DLR, DLG, and DLB as higher-order diffracted lights emitted from the phase modulation elements 54R, 54G, and 54B, respectively, has a light distribution pattern $PTN_L$ of a low beam L.

That is, each of a first light DLR emitted from the phase modulation element 54R, a second light DLG emitted from the phase modulation element 54G, and a third light DLB emitted from the phase modulation element 54B is emitted from the opening 59H of the cover 59, and is emitted to the outside of the headlight 1 through the front cover 12. Each of a first zeroth order light LCR emitted from the phase modulation element 54R, a second zeroth order light LCG emitted from the phase modulation element 54G, and a third zeroth order light LCB emitted from the phase modulation element 54B is emitted from the opening 59H of the cover 59, and is emitted to the outside of the headlight 1 through the front cover 12. Here, the first light DLR, the second light DLG, and the third light DLB are emitted such that respective outer shapes of light distribution patterns substantially match each other at a focal position away from the vehicle by a predetermined distance. The focal position is, for example, a position 25 m away from the vehicle. The first zeroth order light LCR, the second zeroth order light LCG, and the third zeroth order light LCB are emitted such that respective outer shapes of light distribution patterns substantially match each other within a range RNG which is a blind spot of the driver of the automobile. That is, in the embodiment, light emission directions of the first light-emitting optical system 51R, the second light-emitting optical system 51G, and the third light-emitting optical system 51B are finely adjusted such that the outer shapes match each other as described above.

In the headlight 1 of the embodiment, since the synthesis optical system 55 of the second embodiment is not included, a simple configuration may be made. In the headlight 1 of the embodiment, as in the first embodiment, since the zeroth order light having a higher light intensity than the higher-order diffracted light is emitted within the range RNG which is a blind spot of the driver of the automobile, it is possible to suppress the driver's ability in attention calling from being lowered. In the embodiment, the outer shape of the first light DLR, the outer shape of the second light DLG, and the outer shape of the third light DLB, and the outer shape of the first zeroth order light LCR, the outer shape of the second zeroth order light LCG, and the outer shape of the third zeroth order light LCB tend to be slightly deviated from each other outside the above described focal position. However, as compared to that in light obtained by causing white light to be incident on one phase modulation element, the deviation of the outer shapes may be suppressed. Therefore, in the embodiment as well, it is possible to realize a headlight that is reduced in size and is capable of suppressing color blurring.

In the headlight 1 of the embodiment, as in the first embodiment, the phase modulation elements 54R, 54G, and 54B diffract the lights emitted from the light sources 52R, 52G, and 52B, respectively, with changeable phase modulation patterns. For this reason, the headlight 1 may change the light distribution pattern of the emitted light.

Here, descriptions will be made on modifications of the headlight 1 in the first embodiment, the second embodiment, and the third embodiment.

In the first embodiment and the second embodiment, the zeroth order lights LCR, LCG, and LCB emitted from the phase modulation elements 54R, 54G, and 54B, respectively, are synthesized in the synthesis optical system 55, and are projected on the projection region AR. However, the zeroth order lights LCR, LCG, and LCB may not be synthesized in the synthesis optical system 55, and may be projected on separate regions within the range RNG which is a blind spot of the driver of the automobile. As described above, in view of suppressing a pedestrian, etc. outside the vehicle from being unnecessarily conscious of the projection region AR, it is desirable that the zeroth order lights LCR, LCG, and LCB emitted from the phase modulation elements 54R, 54G, and 54B, respectively, are synthesized in the synthesis optical system 55, and projected on the projection region AR.

In the first embodiment, the second embodiment, and the third embodiment, the zeroth order lights LCR, LCG, and LCB emitted from the phase modulation elements 54R, 54G, and 54B, respectively, are projected on the projection region AR below the light distribution pattern $PTN_L$ of the low beam L or the light distribution pattern $PTN_H$ of the high beam as a predetermined light distribution pattern based on phase modulation patterns in the phase modulation elements 54R, 54G, and 54B. However, the projection region AR on which the zeroth order lights LCR, LCG, and LCB are projected only has to be located within a range where the driver's view of the vehicle is obstructed by the vehicle. For example, the projection region on which the zeroth order lights are projected may be on the right side or the left side of the predetermined light distribution pattern based on the phase modulation patterns in the phase modulation elements 54R, 54G, and 54B.

In the first embodiment, the second embodiment, and the third embodiment, the phase modulation elements 54R, 54G, and 54B diffract lights, respectively, such that the outer shapes of light distribution patterns of the lights diffracted by the corresponding phase modulation elements 54R, 54G, and 54B match the outer shape of the light distribution pattern $PTN_L$ of the low beam L or the outer shape of the light distribution pattern $PTN_H$ of the high beam. However, the phase modulation elements 54R, 54G, and 54B only have to diffract lights, respectively, such that light obtained by synthesizing the lights diffracted by the corresponding phase modulation elements 54R, 54G, and 54B in the synthesis optical system 55 has the light distribution pattern $PTN_L$ of the low beam L or the light distribution pattern $PTN_H$ of the high beam as the predetermined light distribution pattern based on the phase modulation patterns in the phase modulation elements 54R, 54G, and 54B. For this reason, the outer shapes of the light distribution patterns of the lights diffracted by the phase modulation elements 54R, 54G, and 54B may not match the outer shape of the light distribution pattern $PTN_L$ of the low beam L or the light distribution pattern $PTN_H$ of the high beam. In view of suppressing the occurrence of color blurring near the edge of the light distribution pattern $PTN_L$ of the emitted low beam L or the light distribution pattern $PTN_H$ of the emitted high beam, it is desirable that the outer shapes of the light distribution patterns of the lights diffracted by the phase modulation elements 54R, 54G, and 54B match the outer shape of the light distribution pattern $PTN_L$ of the low beam L or the light distribution pattern $PTN_H$ of the high beam.

In the first embodiment, the second embodiment, and the third embodiment, the phase modulation elements 54R, 54G, and 54B emit the zeroth order lights LCR, LCG, and LCB such that outer shapes of the zeroth order lights LCR, LCG, and LCB emitted from the corresponding phase modulation elements 54R, 54G, and 54B may be the same outer shapes. However, the outer shapes of the zeroth order lights LCR, LCG, and LCB may be different from each other. In view of suppressing a pedestrian, etc. outside the vehicle from being unnecessarily conscious of the projection region AR, it is desirable that the outer shapes of the zeroth order lights LCR, LCG, and LCB are the same.

Fourth Embodiment

Hereinafter, a fourth embodiment of the present disclosure will be described in detail with reference to FIG. 11. Constitutional elements which are the same or similar as/to those in the first embodiment are denoted by the same reference numerals and redundant descriptions thereof will be omitted except a case where descriptions are made in particular.

Figure 11:
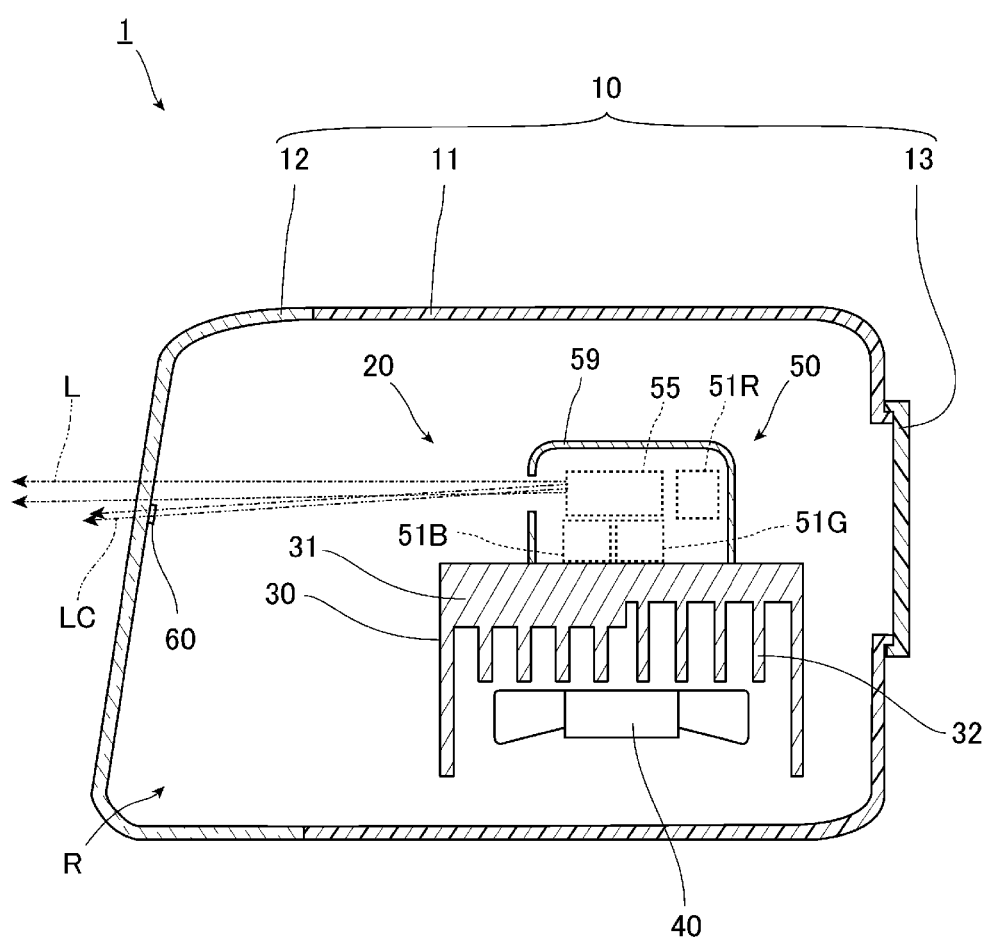
FIG. 11 is a view illustrating a vehicular lamp in a fourth embodiment of the present disclosure in the same manner as in FIG. 1.

FIG. 11 is a view illustrating a vehicular lamp in the fourth embodiment of the present disclosure in the same manner as in FIG. 1. The vehicular lamp of the embodiment is the headlight 1 for the automobile as in the first embodiment. As illustrated in FIG. 11, the optical system unit 50 of the embodiment is different from the optical system unit 50 of the first embodiment in that the optical system unit 50 further includes an optical element 60. For this reason, in the optical system unit 50 of the embodiment, configurations of the first light-emitting optical system 51R, the second light-emitting optical system 51G, the third light-emitting optical system 51B, and the synthesis optical system 55 are the same as configurations of the first light-emitting optical system 51R, the second light-emitting optical system 51G, the third light-emitting optical system 51B, and the synthesis optical system 55 in the optical system unit 50 of the first embodiment as illustrated in FIG. 2.

In the embodiment, as in the first embodiment, as illustrated in FIG. 2, a first light DLR and a first zeroth order light LCR are emitted from the first light-emitting optical system 51R, a second light DLG and a second zeroth order light LCG are emitted from the second light-emitting optical system 51G, and a third light DLB and a third zeroth order light LCB are emitted from the third light-emitting optical system 51B. In the synthesis optical system 55, the first light DLR, the second light DLG, and the third light DLB are synthesized, and the first zeroth order light LCR, the second zeroth order light LCG, and the third zeroth order light LCB are synthesized.

Each of the first light DLR, the second light DLG, and the third light DLB has the same outer shape as the outer shape of a light distribution pattern $PTN_L$ of a low beam L as described above, and has a light intensity distribution based on the light intensity distribution of the light distribution pattern $PTN_L$ of the low beam L. For this reason, light obtained by synthesizing these lights becomes the low beam L, and the low beam L is emitted from the opening 59H of the cover 59, and is emitted from the headlight 1 through the front cover 12.

Light obtained by synthesizing the first zeroth order light LCR, the second zeroth order light LCG, and the third zeroth order light LCB becomes a zeroth order light beam LC of a white color, and is emitted from the opening 59H of the cover 59. The zeroth order light beam LC is emitted from the headlight 1 through the front cover 12. In the first embodiment, a projection region on which the synthesized zeroth order light is projected is located within a range where the driver's view of the automobile is obstructed by a hood of the automobile. However, in the embodiment, the projection region is located outside the light distribution pattern $PTN_L$ of the low beam, and inside the driver's view of the automobile. That is, in the embodiment, the position of each of the light-emitting optical systems or the synthesis optical system is finely adjusted, and phase modulation patterns in the phase modulation elements 54R, 54G, and 54B are different from phase modulation patterns in the phase modulation elements 54R, 54G, and 54B of the first embodiment such that the projection region is located as described above. As in the first embodiment, the projection region may be located within a range where the driver's view of the automobile is obstructed by a hood of the automobile. The phase modulation patterns in the phase modulation elements 54R, 54G, and 54B may be the same as the phase modulation patterns in the phase modulation elements 54R, 54G, and 54B in the first embodiment.

The optical element 60 is an optical element that reduces the energy density of light. Examples of the optical element 60 may include a light shielding element or a light diffusing element. Specific examples of the light shielding element may include one obtained by carrying out a black anodizing processing on a plate made of a metal such as aluminum, or one obtained by molding a light shielding material such as carbon black and a base material. Specific examples of the light diffusing element may include a lens, a sheet, etc. which diffuse or scatter light.

Such an optical element 60 is disposed on an optical path of white zeroth order light obtained by synthesizing the zeroth order lights LCR, LCG, and LCB emitted from the phase modulation elements 54R, 54G, and 54B, between a projection region on which the synthesized zeroth order light is projected and the phase modulation elements 54R, 54G, and 54B. The optical element 60 of the embodiment is disposed within the casing 10. In the example illustrated in FIG. 11, the optical element 60 is disposed on the surface of the front cover 12 on the lamp chamber R side, and the length of an optical path between the corresponding optical element 60 and the phase modulation element 54B closest to the optical element 60 is, for example, 100 mm.

Since the optical element 60 is disposed on the optical path of the zeroth order light as described above, the white zeroth order light obtained by synthesizing the zeroth order lights LCR, LCG, and LCB emitted from the phase modulation elements 54R, 54G, and 54B illuminates the optical element 60, and the energy density of the zeroth order light is reduced by the corresponding optical element 60. Then, the zeroth order light with the reduced energy density is emitted from the headlight 1 through the front cover 12.

As described above, the headlight 1 of the embodiment includes the light sources 52R, 52G, and 52B, the phase modulation elements 54R, 54G, and 54B that diffract lights incident from the light sources 52R, 52G, and 52B with changeable phase modulation patterns, and the optical element 60 that reduces the energy density of light. Light obtained by synthesizing higher-order diffracted lights diffracted by the phase modulation elements 54R, 54G, and 54B, among lights emitted from the phase modulation elements 54R, 54G, and 54B, is emitted as the light distribution pattern $PTN_L$ of the low beam L based on phase modulation patterns in the phase modulation elements 54R, 54G, and 54B. The optical element 60 is disposed on an optical path of light obtained by synthesizing the zeroth order lights LCR, LCG, and LCB emitted from the phase modulation elements 54R, 54G, and 54B between a projection region on which the synthesized light is projected and the phase modulation elements 54R, 54G, and 54B.

Therefore, in the headlight 1 of the embodiment, even when the light intensity of the zeroth order light is higher than the light intensity of the higher-order diffracted light, among the lights emitted from the phase modulation elements 54R, 54G, and 54B, the energy density of the zeroth order light is reduced by the optical element 60. For this reason, it is possible to suppress the projection region of the zeroth order light from becoming significantly brighter than the light distribution pattern $PTN_L$ by the higher-order diffracted light among the lights emitted from the phase modulation elements 54R, 54G, and 54B. Accordingly, the headlight 1 of the embodiment may allow easy driving as compared to that in a case where the optical element 60 is not included.

In the headlight 1 of the embodiment, as in the first embodiment, the phase modulation elements 54R, 54G, and 54B diffract lights emitted from the light sources 52R, 52G, and 52B, respectively, with changeable phase modulation patterns. For this reason, the headlight 1 may change a light distribution pattern of the emitted light. When the phase modulation patterns in the phase modulation elements 54R, 54G, and 54B are changed, the optical element 60 may be disposed on an optical path of light obtained by synthesizing zeroth order lights emitted from the phase modulation elements 54R, 54G, and 54B with the changed phase modulation patterns between a projection region on which the synthesized light is projected and the phase modulation elements 54R, 54G, and 54B. Accordingly, the headlight 1 may allow easy driving even when the light distribution pattern of the emitted light is changed.

In the headlight 1 of the embodiment, the optical element 60 is disposed within the casing 10 as described above. For this reason, zeroth order light is suppressed from being emitted to the outside of the vehicle. Therefore, it is possible to suppress a projection region of the zeroth order light from being significantly bright outside the vehicle, and as a result, it is possible to suppress a driver, a pedestrian, etc. from being unnecessarily conscious of the projection region.

In the headlight 1 of the embodiment, the optical element 60 may be a light shielding element or a light diffusing element as described above. For this reason, in the headlight 1 of the embodiment, it is possible to select the light shielding element or the light diffusing element as the optical element 60 according to the type of vehicle on which the corresponding headlight 1 is mounted, etc.

In the headlight 1 of the embodiment, a projection region on which zeroth order light is projected is located outside the light distribution pattern $PTN_L$ of the low beam L. That is, the light distribution pattern $PTN_L$ of the low beam L based on phase modulation patterns in the phase modulation elements 54R, 54G, and 54B is a light distribution pattern in which the projection region is located outside the light distribution pattern $PTN_L$ of the low beam L. For this reason, it is possible to suppress a part of the light distribution pattern $PTN_L$ of the corresponding low beam L from becoming significantly bright as compared to that in a case where the projection region is located within the light distribution pattern $PTN_L$ of the low beam L, and as a result, easier driving is possible. When phase modulation patterns in the phase modulation elements 54R, 54G, and 54B are changed, a light distribution pattern based on the changed phase modulation patterns may be a light distribution pattern in which the projection region is located outside the corresponding light distribution pattern. Accordingly, as in a case where light with the light distribution pattern $PTN_L$ of the low beam L is emitted, the headlight 1 may allow easy driving.

The headlight 1 of the embodiment includes a plurality of light-emitting optical systems each of which includes one light source and one phase modulation element. That is, the headlight 1 includes the first light-emitting optical system 51R including one light source 52R and one phase modulation element 54R, the second light-emitting optical system 51G including one light source 52G and one phase modulation element 54G, the third light-emitting optical system 51B including one light source 52B and one phase modulation element 54B, and the synthesis optical system 55 that synthesizes lights emitted from the light-emitting optical systems 51R, 51G, and 51B, respectively. The light sources 52R, 52G, and 52B emit lights with mutually different predetermined wavelengths respectively, and the phase modulation elements 54R, 54G, and 54B diffract the lights from the light sources 52R, 52G, and 52B, respectively, such that light obtained through synthesis in the synthesis optical system 55 has the light distribution pattern $PTN_L$ of the low beam L. Therefore, in the same manner as in the first embodiment, in the headlight 1 of the embodiment, it is possible to suppress the occurrence of color blurring near the edge of the light distribution pattern $PTN_L$ of the emitted low beam L.

In the headlight 1 of the embodiment, the zeroth order lights LCR, LCG, and LCB emitted from the phase modulation elements 54R, 54G, and 54B, respectively, are synthesized in the synthesis optical system 55, and the optical element 60 reduces the energy density of the zeroth order light obtained through synthesis in the synthesis optical system 55. For this reason, as compared to that in a case where the zeroth order lights LCR, LCG, and LCB emitted from the phase modulation elements 54R, 54G, and 54B, respectively are not synthesized, it is possible to reduce an illumination region of the zeroth order light illuminating the optical element 60. Therefore, it is possible to suppress the energy density of the lights DLR, DLG, and DLB as higher-order diffracted lights among lights emitted from the phase modulation elements 54R, 54G, and 54B from being reduced in the optical element 60.

Fifth Embodiment

Hereinafter, a fifth embodiment of the present disclosure will be described in detail with reference to FIG. 12. Constitutional elements which are the same or similar as/to those in the fourth embodiment are denoted by the same reference numerals and redundant descriptions thereof will be omitted except a case where descriptions are made in particular.

Figure 12:
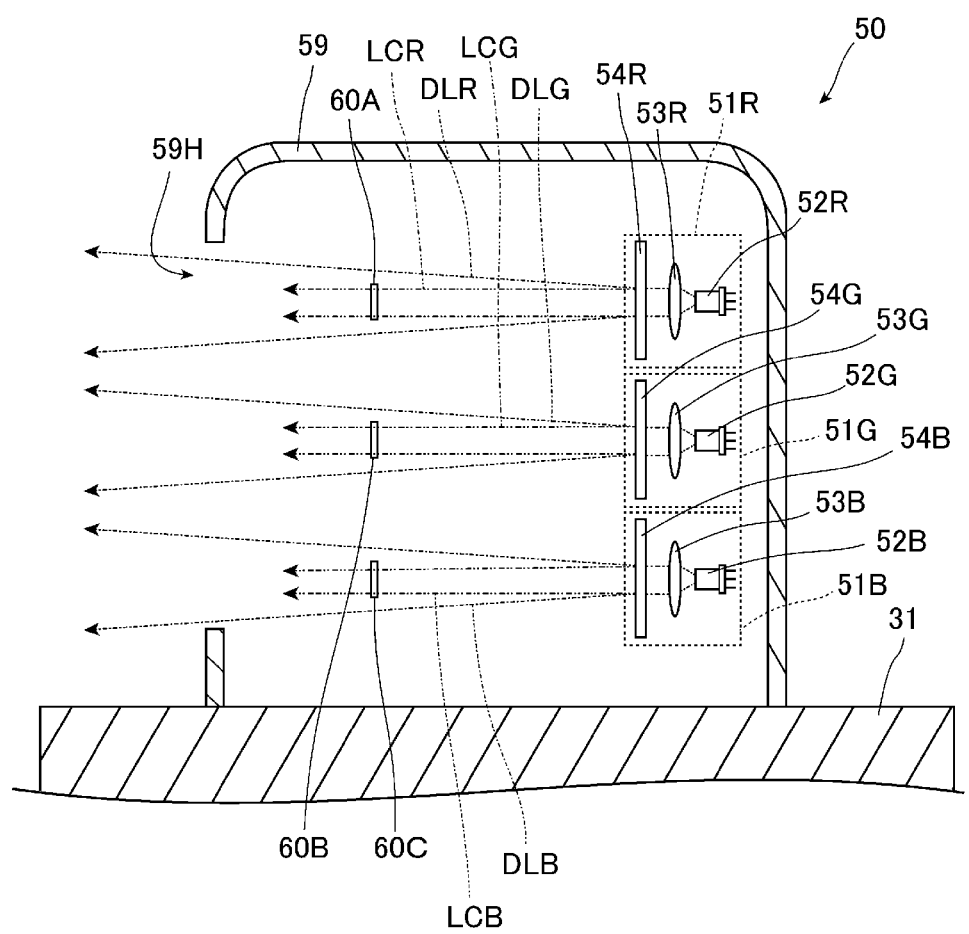
FIG. 12 is a view illustrating an optical system unit in a fifth embodiment of the present disclosure in the same manner as in FIG. 2.

FIG. 12 is a view illustrating an optical system unit in the fifth embodiment of the present disclosure in the same manner as in FIG. 2. As illustrated in FIG. 12, as in the second embodiment and the third embodiment, the optical system unit 50 of the embodiment is different from the optical system unit 50 of the fourth embodiment in that each of the phase modulation elements 54R, 54G, and 54B is a transmission-type phase modulation element that diffracts and emits incident light while transmitting the incident light. The optical system unit 50 of the embodiment is also different from the optical system unit 50 of the fourth embodiment in that the optical system unit 50 does not include the synthesis optical system 55, and respective lights emitted from the first light-emitting optical system 51R, the second light-emitting optical system 51G, and the third light-emitting optical system 51B, in an unsynthesized state, are emitted from the cover 59. In the embodiment, light emission directions of the first light-emitting optical system 51R, the second light-emitting optical system 51G, and the third light-emitting optical system 51B are on the opening 59H side of the cover 59.

In the embodiment as well, as in the fourth embodiment, the phase modulation elements 54R, 54G, and 54B diffract laser lights emitted from the collimator lenses 53R, 53G, and 53B, respectively, such that light, which is obtained by synthesizing lights DLR, DLG, and DLB as higher-order diffracted lights emitted from the phase modulation elements 54R, 54G, and 54B, respectively, has a light distribution pattern $PTN_L$ of a low beam L based on phase modulation patterns in the phase modulation elements 54R, 54G, and 54B.

That is, each of a first light DLR emitted from the phase modulation element 54R, a second light DLG emitted from the phase modulation element 54G, and a third light DLB emitted from the phase modulation element 54B is emitted from the opening 59H of the cover 59, and is emitted to the outside of the headlight 1 through the front cover 12. Each of a first zeroth order light LCR emitted from the phase modulation element 54R, a second zeroth order light LCG emitted from the phase modulation element 54G, and a third zeroth order light LCB emitted from the phase modulation element 54B is emitted from the opening 59H of the cover 59, and is emitted to the outside of the headlight 1 through the front cover 12. Here, the first light DLR, the second light DLG and the third light DLB are emitted such that respective outer shapes of light distribution patterns substantially match each other at a focal position away from the vehicle by a predetermined distance. The first zeroth order light LCR, the second zeroth order light LCG, and the third zeroth order light LCB are also emitted such that respective outer shapes of light distribution patterns substantially match each other at a focal position away from the vehicle by a predetermined distance. The focal position is, for example, a position 25 m away from the vehicle. That is, in the embodiment, light emission directions of the first light-emitting optical system 51R, the second light-emitting optical system 51G, and the third light-emitting optical system 51B are finely adjusted such that the outer shapes match each other as described above.

The optical system unit 50 of the embodiment is different from the optical system unit 50 of the fourth embodiment in that the optical system unit 50 includes optical elements 60A, 60B, and 60C that reduce the energy density of zeroth order light emitted from the first light-emitting optical system 51R, the second light-emitting optical system 51G, and the third light-emitting optical system 51B, instead of the optical element 60. The optical element 60A is disposed on an optical path of the first zeroth order light LCR between a projection region of the first zeroth order light LCR and the phase modulation element 54R. The optical element 60B is disposed on an optical path of the second zeroth order light LCG between a projection region of the second zeroth order light LCG and the phase modulation element 54G, and the optical element 60C is disposed on an optical path of the third zeroth order light LCB between a projection region of the third zeroth order light LCB and the phase modulation element 54B. The arrangement positions of the optical elements 60A, 60B, and 60C are positions overlapping the first light DLR emitted from the phase modulation element 54R, the second light DLG emitted from the phase modulation element 54G, and the third light DLB emitted from the phase modulation element 54B, but may be positions not overlapping the first light DLR, the second light DLG, and the third light DLB. In the embodiment, the optical elements 60A, 60B, and 60C are disposed within the cover 59, and are fixed to the cover 59 via a fixing device (not illustrated). Each of the length of the optical path between the optical element 60A and the phase modulation element 54R, the length of the optical path between the optical element 60B and the phase modulation element 54G, and the length of the optical path between the optical element 60C and the phase modulation element 54B is, for example, 100 mm. For this reason, it can be understood that the optical system unit 50 of the embodiment has a larger configuration than the optical system unit 50 of the fourth embodiment.

In the headlight 1 of the embodiment, since the synthesis optical system 55 of the fourth embodiment is not included, a simple configuration may be made. Even when the light intensity of zeroth order light is higher than the light intensity of higher-order diffracted light, among lights emitted from the phase modulation elements 54R, 54G, and 54B, the energy density of the zeroth order light is reduced by the optical elements 60A, 60B, and 60C. For this reason, although the synthesis optical system 55 is not included, in the same manner as the fourth embodiment, it is possible to suppress a projection region of the zeroth order light from becoming significantly brighter than the light distribution pattern $PTN_L$ by the higher-order diffracted light. In the embodiment, the outer shape of the first light DLR, the outer shape of the second light DLG, and the outer shape of the third light DLB, and the outer shape of the first zeroth order light LCR, the outer shape of the second zeroth order light LCG, and the outer shape of the third zeroth order light LCB tend to be slightly deviated from each other outside the above described focal position. However, as compared to that in light obtained by causing white light to be incident on one phase modulation element, the deviation of the outer shapes may be suppressed. Therefore, in the embodiment as well, it is possible to realize a headlight that is reduced in size and is capable of suppressing color blurring.

In the headlight 1 of the embodiment, as in the fourth embodiment, the phase modulation elements 54R, 54G, and 54B diffract the lights emitted from the light sources 52R, 52G, and 52B, respectively, with changeable phase modulation patterns. For this reason, the headlight 1 may change the light distribution pattern of the emitted light.

Hereinafter, descriptions will be made on modifications of the headlight 1 in the fourth embodiment and the fifth embodiment.

In the fourth embodiment, the phase modulation elements 54R, 54G, and 54B are reflection-type phase modulation elements. However, in the fourth embodiment, as in the second embodiment illustrated in FIG. 8, the phase modulation elements 54R, 54G, and 54B may be transmission-type phase modulation elements.

In the fourth embodiment and the fifth embodiment, a projection region of zeroth order light is located outside the light distribution pattern $PTN_L$ of the low beam L based on phase modulation patterns in the phase modulation elements 54R, 54G, and 54B. However, the projection region of the zeroth order light may be located within the light distribution pattern $PTN_L$ of the low beam L. In this case, it is desirable that the projection region is included within a region where the light intensity is below half the highest light intensity in a light intensity distribution of light obtained by synthesizing higher-order diffracted lights diffracted by the phase modulation elements 54R, 54G, and 54B, in the light distribution pattern $PTN_L$ of the low beam L. That is, the light distribution pattern $PTN_L$ of the low beam L based on the phase modulation patterns in the phase modulation elements 54R, 54G, and 54B may be a light distribution pattern in which the projection region is included within a region where the light intensity is below half the highest light intensity in the light intensity distribution of the light obtained by synthesizing the lights diffracted by the phase modulation elements 54R, 54G, and 54B, in the light distribution pattern $PTN_L$ of the low beam L. Accordingly, as compared to that in a case where the projection region is included in a region where the light intensity is higher than half the highest light intensity in the light intensity distribution of the light obtained by synthesizing the higher-order diffracted lights, the light intensity distribution of the light distribution pattern formed by the higher-order diffracted lights and the zeroth order lights easily becomes a smooth light intensity distribution with reference to a position with the highest light intensity in the corresponding light intensity distribution. When phase modulation patterns in the phase modulation elements 54R, 54G, and 54B are changed, a light distribution pattern based on the changed phase modulation patterns may be a light distribution pattern in which the projection region is included within a region where the light intensity is below half the highest light intensity in a light intensity distribution of light obtained by synthesizing lights diffracted by the phase modulation elements 54R, 54G, and 54B, in the corresponding light distribution pattern. Accordingly, the light intensity distribution of the light distribution pattern formed by the higher-order diffracted lights and the zeroth order lights emitted from the phase modulation elements 54R, 54G, and 54B on the basis of the changed phase modulation patterns easily becomes a smooth light intensity distribution.

In the fourth embodiment and the fifth embodiment, the optical element 60 may cause the energy density of the incident zeroth order light to be zero, or may emit the zeroth order light at an energy density smaller than the energy density of the incident zeroth order light. As described above, when the projection region is located within the light distribution pattern $PTN_L$ of the low beam L based on phase modulation patterns in the phase modulation elements 54R, 54G, and 54B, it is desirable to employ the optical element 60 that emits the zeroth order light at an energy density smaller than the energy density of the incident zeroth order light. Accordingly, while the zeroth order light is used as a part of the light distribution pattern $PTN_L$ of the low beam L, it is possible to suppress the projection region of the zeroth order light from becoming significantly bright in the corresponding light distribution pattern $PTN_L$.

In the fourth embodiment, the zeroth order lights LCR, LCG, and LCB emitted from the phase modulation elements 54R, 54G, and 54B, respectively, are synthesized in the synthesis optical system 55, and projected on a projection region. However, the zeroth order lights LCR, LCG, and LCB may not be synthesized in the synthesis optical system 55, and may be projected on separate regions.

Sixth Embodiment

Next, a sixth embodiment of the present disclosure will be described in detail. Constitutional elements which are the same or similar as/to those in the first embodiment are denoted by the same reference numerals and redundant descriptions thereof will be omitted except a case where descriptions are made in particular.

The vehicular lamp of the embodiment is the headlight 1 for the automobile as in the first embodiment. Since the configuration of the headlight 1 of the embodiment is the same as the configuration of the headlight 1 in the first embodiment, the headlight 1 of the embodiment will be described with reference to FIGS. 1 and 2.

A light distribution pattern of light emitted from the headlight 1 of the embodiment is different from a light distribution pattern of light emitted from the headlight 1 of the first embodiment. That is, phase modulation patterns in the phase modulation elements 54R, 54G, and 54B of the embodiment are different from phase modulation patterns in the phase modulation elements 54R, 54G, and 54B of the first embodiment.

Specifically, in the embodiment, the respective phase modulation patterns in the phase modulation elements 54R, 54G, and 54B are phase modulation patterns that diffract laser lights emitted from the collimator lenses 53R, 53G, and 53B, respectively, such that light, which is obtained by synthesizing lights DLR, DLG, and DLB as higher-order diffracted lights emitted from the phase modulation elements 54R, 54G, and 54B, respectively, in the synthesis optical system 55, has a predetermined light distribution pattern. That is, the phase modulation elements 54R, 54G, and 54B diffract the laser lights emitted from the collimator lenses 53R, 53G, and 53B, respectively, such that light, which is obtained by synthesizing the lights DLR, DLG, and DLB as the higher-order diffracted lights emitted from the phase modulation elements 54R, 54G, and 54B, respectively, in the synthesis optical system 55, has the predetermined light distribution pattern. The predetermined light distribution pattern also includes a light intensity distribution. For this reason, in the embodiment, the light DLR emitted from the phase modulation element 54R has the same outer shape as the outer shape of the predetermined light distribution pattern and has a light intensity distribution based on the light intensity distribution of the predetermined light distribution pattern. The light DLG emitted from the phase modulation element 54G has the same outer shape as the outer shape of the predetermined light distribution pattern and has a light intensity distribution based on the light intensity distribution of the predetermined light distribution pattern, and the light DLB emitted from the phase modulation element 54B has the same outer shape as the outer shape of the predetermined light distribution pattern and has a light intensity distribution based on the light intensity distribution of the predetermined light distribution pattern.

The phase modulation elements 54R, 54G, and 54B emit zeroth order lights LCR, LCG, and LCB such that a projection region on which a zeroth order light beam LC, which is obtained by synthesizing the zeroth order lights LCR, LCG, and LCB emitted from the corresponding phase modulation elements 54R, 54G, and 54B, respectively, in the synthesis optical system 55, is projected is located within the predetermined light distribution pattern. In the embodiment, the phase modulation elements 54R, 54G, and 54B emit the zeroth order lights LCR, LCG, and LCB such that the outer shapes of the zeroth order lights LCR, LCG, and LCB emitted from the corresponding phase modulation elements 54R, 54G, and 54B, respectively, may be the same outer shapes.

In the embodiment, in the same manner as in the first embodiment, as illustrated in FIG. 2, the first light DLR and the first zeroth order light LCR are emitted from the first light-emitting optical system 51R, the second light DLG and the second zeroth order light LCG are emitted from the second light-emitting optical system 51G, and the third light DLB and the third zeroth order light LCB are emitted from the third light-emitting optical system 51B. In the synthesis optical system 55, the first light DLR, the second light DLG, and the third light DLB are synthesized, and the first zeroth order light LCR, the second zeroth order light LCG, and the third zeroth order light LCB are synthesized.

Each of the first light DLR, the second light DLG, and the third light DLB has the same outer shape as the outer shape of the predetermined light distribution pattern as described above, and has a light intensity distribution based on the light intensity distribution of the predetermined light distribution pattern. For this reason, the light obtained by synthesizing these lights becomes white light having the predetermined light distribution pattern, and this light is emitted from the opening 59H of the cover 59, and is emitted from the headlight 1 through the front cover 12.

The light obtained by synthesizing the first zeroth order light LCR, the second zeroth order light LCG, and the third zeroth order light LCB becomes a zeroth order light beam LC of a white color, and then is emitted from the opening 59H of the cover 59, and is emitted from the headlight 1 through the front cover 12.

In the embodiment, the predetermined light distribution pattern in the light obtained by synthesizing the lights DLR, DLG, and DLB as the higher-order diffracted lights is a light distribution pattern in which a low beam light distribution pattern is formed by the light obtained by synthesizing the lights DLR, DLG, and DLB and the zeroth order light beam LC obtained by synthesizing the zeroth order lights LCR, LCG, and LCB. For this reason, a low beam is emitted from the headlight 1.

Figure 13:
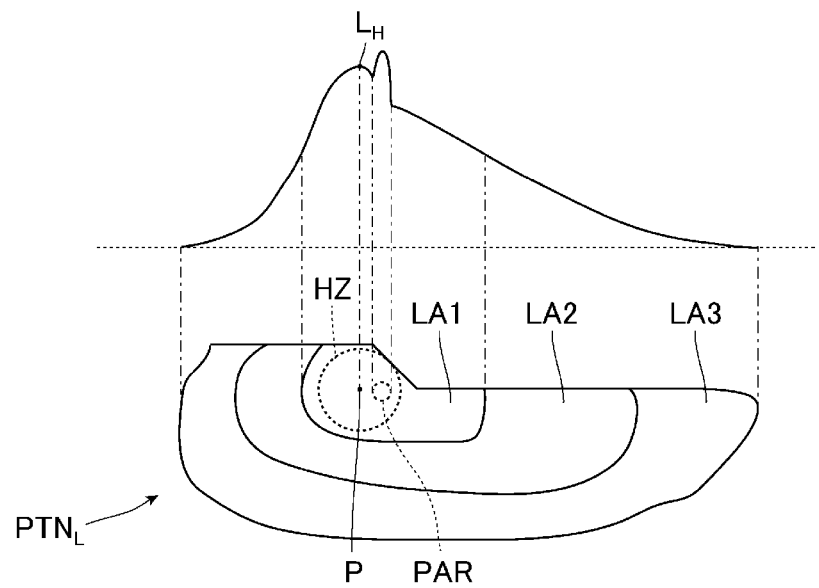
FIG. 13 is a view illustrating a low beam light distribution pattern, and a light intensity distribution of the light distribution pattern in a sixth embodiment of the present disclosure.

FIG. 13 is a view illustrating a low beam light distribution pattern and a light intensity distribution of the light distribution pattern, in the embodiment. As illustrated in FIG. 13, the low beam light distribution pattern $PTN_L$ has a first region LA1, a second region LA2, and a third region LA3, and the light intensity decreases in the order of the first region LA1, the second region LA2, and the third region LA3.

The first region LA1 is a region where the light intensity is higher than a first light intensity threshold in the light intensity distribution of the light obtained by synthesizing the lights DLR, DLG, and DLB as the higher-order diffracted lights. The first region LA1 includes a portion P with the highest light intensity $L_H$ in the light intensity distribution of the light obtained by synthesizing the lights DLR, DLG, and DLB. The second region LA2 is a region where the light intensity is equal to or less than the first light intensity threshold and is higher than a second light intensity threshold set to be lower than the first light intensity threshold, in the light intensity distribution of the light obtained by synthesizing the lights DLR, DLG, and DLB. The third region LA3 is a region where the light intensity is equal to or less than the second light intensity threshold, in the light intensity distribution of the light obtained by synthesizing the lights DLR, DLG, and DLB. The first light intensity threshold is, for example, a half value of the highest light intensity $L_H$, in the light intensity distribution of the light obtained by synthesizing the lights DLR, DLG, and DLB.

In such a low beam light distribution pattern $PTN_L$, a projection region PAR on which the light obtained by synthesizing the zeroth order lights LCR, LCG, and LCB is projected is located within the first region LA1, and is located within a hot zone HZ narrower than the first region LA1. Meanwhile, the projection region PAR is located avoiding the portion P with the highest light intensity $L_H$ in the light intensity distribution of the light obtained by synthesizing the lights DLR, DLG, and DLB. The light intensity of the projection region PAR is the sum of the light intensity of the light obtained by synthesizing the lights DLR, DLG, and DLB and the light intensity of the zeroth order light beam LC obtained by synthesizing the zeroth order lights LCR, LCG, and LCB. In the example illustrated in FIG. 13, the light intensity of the projection region PAR is higher than the highest light intensity $L_H$ in the light intensity distribution of the light obtained by synthesizing the lights DLR, DLG, and DLB, but may be lower than the corresponding light intensity $L_H$. For example, by not causing the light obtained by synthesizing the lights DLR, DLG, and DLB to illuminate the projection region PAR, the light intensity of the projection region PAR may be lower than the corresponding light intensity $L_H$.

As described above, the headlight 1 of the embodiment includes the light sources 52R, 52G, and 52B, and the phase modulation elements 54R, 54G, and 54B that diffract lights incident from the light sources 52R, 52G, and 52B with changeable phase modulation patterns.

The low beam light distribution pattern $PTN_L$ based on the phase modulation patterns in the phase modulation elements 54R, 54G, and 54B is formed by the lights DLR, DLG, and DLB diffracted by the phase modulation elements 54R, 54G, and 54B, and the zeroth order lights LCR, LCG, and LCB that are emitted from the phase modulation elements without being diffracted by the phase modulation elements 54R, 54G, and 54B. As illustrated in FIG. 13, in the low beam light distribution pattern $PTN_L$, the projection region PAR of the zeroth order light is located within a region where the light intensity is higher than half the highest light intensity $L_H$ in the light intensity distribution of the light obtained by synthesizing the lights DLR, DLG, and DLB as the higher-order diffracted lights. That is, the light distribution pattern of the light obtained by synthesizing the lights diffracted by the phase modulation elements 54R, 54G, and 54B is a light distribution pattern in which the projection region PAR is located within a region where the light intensity is higher than half the highest light intensity $L_H$ in the light intensity distribution, in the corresponding light distribution pattern.

Therefore, even when the projection region PAR is irradiated with the zeroth order light having a higher light intensity than the higher-order diffracted light, it is possible to suppress the projection region PAR from becoming significantly bright in the low beam light distribution pattern $PTN_L$. Therefore, the headlight 1 of the embodiment may allow easy driving as compared to that in a case where the projection region PAR is disposed outside the region where the light intensity is higher than half the highest light intensity $L_H$ in the light intensity distribution of the light obtained by synthesizing the lights DLR, DLG, and DLB.

In the headlight 1 of the embodiment, as in the first embodiment, the phase modulation elements 54R, 54G, and 54B diffract lights emitted from the light sources 52R, 52G, and 52B, respectively, with changeable phase modulation patterns. For this reason, the headlight 1 may change a light distribution pattern of the emitted light. When the phase modulation patterns in the phase modulation elements 54R, 54G, and 54B are changed, a light distribution pattern of light obtained by synthesizing lights diffracted by the phase modulation elements 54R, 54G, and 54B with the changed phase modulation patterns may be a light distribution pattern in which a projection region is located within a region where the light intensity is higher than half the highest light intensity in the light intensity distribution in the corresponding light distribution pattern. Accordingly, even when the light distribution pattern of the emitted light is changed, the headlight 1 may allow easy driving.

In the embodiment, the projection region PAR is located avoiding the portion P with the highest light intensity $L_H$ in the light intensity distribution of the light obtained by synthesizing the lights DLR, DLG, and DLB. That is, a light distribution pattern of the light obtained by synthesizing the lights diffracted by the phase modulation elements 54R, 54G, and 54B is a light distribution pattern in which the projection region PAR is located avoiding the portion P with the highest light intensity $L_H$ in the light intensity distribution in the corresponding light distribution pattern. Therefore, it is possible to suppress the portion P with the highest light intensity $L_H$ from being excessively bright in the light distribution pattern of the light obtained by synthesizing the lights DLR, DLG, and DLB. When the phase modulation patterns are changed in the phase modulation elements 54R, 54G, and 54B, a light distribution pattern of light obtained by synthesizing lights diffracted by the phase modulation elements 54R, 54G, and 54B with the changed phase modulation patterns may be a light distribution pattern in which the projection region PAR is located avoiding the portion P with the highest light intensity $L_H$ in the light intensity distribution in the corresponding light distribution pattern. Accordingly, it is possible to suppress the portion P with the highest light intensity $L_H$ from being excessively bright in the light distribution pattern of the light obtained by synthesizing the lights diffracted by the phase modulation elements 54R, 54G, and 54B with the changed phase modulation patterns.

In the embodiment, the projection region PAR is located within the hot zone HZ. That is, a light distribution pattern of light obtained by synthesizing lights diffracted by the phase modulation elements 54R, 54G, and 54B is a light distribution pattern in which a region where the light intensity is higher than half the highest light intensity $L_H$ in the light intensity distribution of the corresponding light distribution pattern is the hot zone HZ in the light distribution pattern formed by lights diffracted by the phase modulation elements 54R, 54G, and 54B and zeroth order lights. Then, the projection region PAR is located within the hot zone HZ. For this reason, while the zeroth order lights LCR, LCG, and LCB are used to form the low beam light distribution pattern $PTN_L$, it is possible to suppress the projection region PAR from being significantly bright in the corresponding light distribution pattern $PTN_L$. When phase modulation patterns are changed in the phase modulation elements 54R, 54G, and 54B, the projection region PAR may be located within the hot zone HZ. Accordingly, while zeroth order lights emitted from the phase modulation elements 54R, 54G, and 54B with the changed phase modulation patterns are used to form a light distribution pattern, it is possible to suppress the projection region from being significantly bright in the corresponding light distribution pattern.

The headlight 1 of the embodiment includes a plurality of light-emitting optical systems each of which includes one light source and one phase modulation element. That is, the headlight 1 includes the first light-emitting optical system 51R including one light source 52R and one phase modulation element 54R, the second light-emitting optical system 51G including one light source 52G and one phase modulation element 54G, the third light-emitting optical system 51B including one light source 52B and one phase modulation element 54B, and the synthesis optical system 55 that synthesizes lights emitted from the light-emitting optical systems 51R, 51G, and 51B, respectively. The light sources 52R, 52G, and 52B emit lights with mutually different predetermined wavelengths, respectively, and the phase modulation elements 54R, 54G, and 54B emit the lights from the light sources 52R, 52G, and 52B, respectively, such that light obtained through synthesis in the synthesis optical system 55 has the low beam light distribution pattern $PTN_L$.

In this case, the lights with predetermined wavelengths, which are emitted from the light sources 52R, 52G, and 52B, respectively, are diffracted by the phase modulation elements 54R, 54G, and 54B so that light distribution patterns are formed. Here, the lights diffracted by the phase modulation elements 54R, 54G, and 54B have predetermined wavelengths in the light-emitting optical systems 51R, 51G, and 51B, respectively. Thus, even when the phase modulation elements 54R, 54G, and 54B have wavelength dependencies, it is possible to suppress the occurrence of color blurring near the edges of the light distribution patterns in the lights emitted from the phase modulation elements 54R, 54G, and 54B, respectively. The lights having the light distribution patterns in which color blurring is suppressed as described above are synthesized in the synthesis optical system 55, and then, the low beam light distribution pattern $PTN_L$ is formed. Therefore, in the headlight 1 of the embodiment, it is possible to suppress the occurrence of color blurring near the edge of the light distribution pattern $PTN_L$ of the emitted low beam.

In the headlight 1 of the embodiment, the zeroth order lights LCR, LCG, and LCB emitted from the phase modulation elements 54R, 54G, and 54B, respectively, are synthesized in the synthesis optical system 55, and projected on the projection region PAR. In this case, even when the phase modulation elements 54R, 54G, and 54B have wavelength dependencies as described above, the zeroth order lights LCR, LCG, and LCB emitted from the phase modulation elements 54R, 54G, and 54B, respectively, may be projected to have the same white color. Therefore, in the headlight 1 of the embodiment, it is possible to suppress a driver from being unnecessarily conscious of the projection region PAR, which may allow easier driving.

Hereinafter, descriptions will be made on modifications of the headlight 1 in the sixth embodiment.

In the sixth embodiment, the first light-emitting optical system 51R, the second light-emitting optical system 51G, and the third light-emitting optical system 51B include reflection-type phase modulation elements 54R, 54G, and 54B respectively. However, the first light-emitting optical system 51R, the second light-emitting optical system 51G, and the third light-emitting optical system 51B may include transmission-type phase modulation elements 54R, 54G, and 54B, respectively, like the first light-emitting optical system 51R, the second light-emitting optical system 51G, and the third light-emitting optical system 51B in the second embodiment illustrated in FIG. 8.

In the sixth embodiment, the optical system unit 50 includes the synthesis optical system 55. However, the optical system unit 50 may not include the synthesis optical system 55 like the optical system unit 50 of the third embodiment illustrated in FIG. 10.

In the sixth embodiment, the zeroth order lights LCR, LCG, and LCB emitted from the phase modulation elements 54R, 54G, and 54B, respectively, may not be synthesized in the synthesis optical system 55, and may illuminate separate regions within the projection region PAR. As described above, in view of suppressing a driver from being unnecessarily conscious of the projection region PAR, it is desirable that the zeroth order lights LCR, LCG, and LCB emitted from the phase modulation elements 54R, 54G, and 54B, respectively, are synthesized in the synthesis optical system 55, and are projected on the projection region PAR. In the sixth embodiment, the projection region PAR is located within the hot zone HZ. However, the projection region PAR may be located outside the hot zone HZ.

In the sixth embodiment, the projection region PAR is located avoiding a position with the highest light intensity $L_H$ in the light intensity distribution of the higher-order diffracted lights, but may include the corresponding position. In this case, the brightest region in the low beam light distribution pattern $PTN_L$ substantially does not change regardless of whether the light intensity of the zeroth order light is high. For this reason, the light intensity distribution of the low beam light distribution pattern $PTN_L$ easily becomes a smoother light intensity distribution with reference to a position with the highest light intensity in the light intensity distribution of the higher-order diffracted lights. As described above, in view of suppressing the portion P with the highest light intensity $L_H$ from being excessively bright in the light distribution pattern of the higher-order diffracted lights, it is desirable that the projection region PAR is located avoiding the position with the highest light intensity $L_H$ in the light intensity distribution of the higher-order diffracted lights.

Seventh Embodiment

Hereinafter, a seventh embodiment of the present disclosure will be described in detail. Constitutional elements which are the same or similar as/to those in the sixth embodiment are denoted by the same reference numerals and redundant descriptions thereof will be omitted except a case where descriptions are made in particular.

The vehicular lamp of the embodiment is the headlight 1 for the automobile as in the sixth embodiment. The configuration of the headlight 1 of the embodiment is the same as the configuration of the headlight 1 in the sixth embodiment. As described above, since the headlight 1 in the sixth embodiment has the same configuration as the headlight 1 in the first embodiment, the configuration of the headlight 1 of the embodiment is the same as the configuration of the headlight 1 in the first embodiment. For this reason, the headlight 1 of the embodiment will be described with reference to FIGS. 1, and 2.

A light distribution pattern of light emitted from the headlight 1 of the embodiment is different from a light distribution pattern of light emitted from the headlight 1 of the sixth embodiment. That is, phase modulation patterns in the phase modulation elements 54R, 54G, and 54B in the embodiment are different from phase modulation patterns in the phase modulation elements 54R, 54G, and 54B in the sixth embodiment.

Specifically, in the embodiment, as in the sixth embodiment, the respective phase modulation patterns in the phase modulation elements 54R, 54G, and 54B are phase modulation patterns that diffract laser lights emitted from the collimator lenses 53R, 53G, and 53B, respectively, such that light, which is obtained by synthesizing lights DLR, DLG, and DLB as higher-order diffracted lights emitted from the phase modulation elements 54R, 54G, and 54B, respectively, in the synthesis optical system 55, has a predetermined light distribution pattern.

As in the sixth embodiment, the phase modulation elements 54R, 54G, and 54B emit zeroth order lights LCR, LCG, and LCB such that a projection region on which a zeroth order light beam LC, which is obtained by synthesizing the zeroth order lights LCR, LCG, and LCB emitted from the corresponding phase modulation elements 54R, 54G, and 54B, respectively, in the synthesis optical system 55, is projected is located within the predetermined light distribution pattern.

Here, the respective phase modulation patterns in the phase modulation elements 54R, 54G, and 54B in the embodiment are also phase modulation patterns that diffract the laser lights emitted from the collimator lenses 53R, 53G, and 53B, respectively, such that the light, which is obtained by synthesizing the lights DLR, DLG, and DLB as the higher-order diffracted lights emitted from the phase modulation elements 54R, 54G, and 54B, respectively, does not illuminate the projection region on which the zeroth order light beam LC obtained by synthesizing the zeroth order lights LCR, LCG, and LCB is projected. Therefore, in the light distribution pattern formed by the light obtained by synthesizing the lights DLR, DLG, and DLB as the higher-order diffracted lights and the zeroth order light beam LC, in the projection region on which the zeroth order light beam LC is projected, the light intensity of the light obtained by synthesizing the lights DLR, DLG, and DLB as the higher-order diffracted lights is zero.

In the embodiment, in the same manner as in the sixth embodiment, as illustrated in FIG. 2, the first light DLR and the first zeroth order light LCR are emitted from the first light-emitting optical system 51R, the second light DLG and the second zeroth order light LCG are emitted from the second light-emitting optical system 51G, and the third light DLB and the third zeroth order light LCB are emitted from the third light-emitting optical system 51B. In the synthesis optical system 55, the first light DLR, the second light DLG, and the third light DLB are synthesized, and the first zeroth order light LCR, the second zeroth order light LCG, and the third zeroth order light LCB are synthesized. The light obtained by synthesizing the lights DLR, DLG, and DLB as the higher-order diffracted lights becomes white light having the predetermined light distribution pattern, and this light is emitted from the opening 59H of the cover 59, and is emitted from the headlight 1 through the front cover 12. The light obtained by synthesizing the zeroth order lights LCR, LCG, and LCB becomes the zeroth order light beam LC of a white color, and then is emitted from the opening 59H of the cover 59, and is emitted from the headlight 1 through the front cover 12.

In the embodiment, as in the sixth embodiment, the predetermined light distribution pattern in the light obtained by synthesizing the lights DLR, DLG, and DLB as the higher-order diffracted lights is a light distribution pattern in which a low beam light distribution pattern is formed by the light obtained by synthesizing the lights DLR, DLG, and DLB and the zeroth order light beam LC obtained by synthesizing the zeroth order lights LCR, LCG, and LCB. For this reason, a low beam is emitted from the headlight 1.

Figure 14:
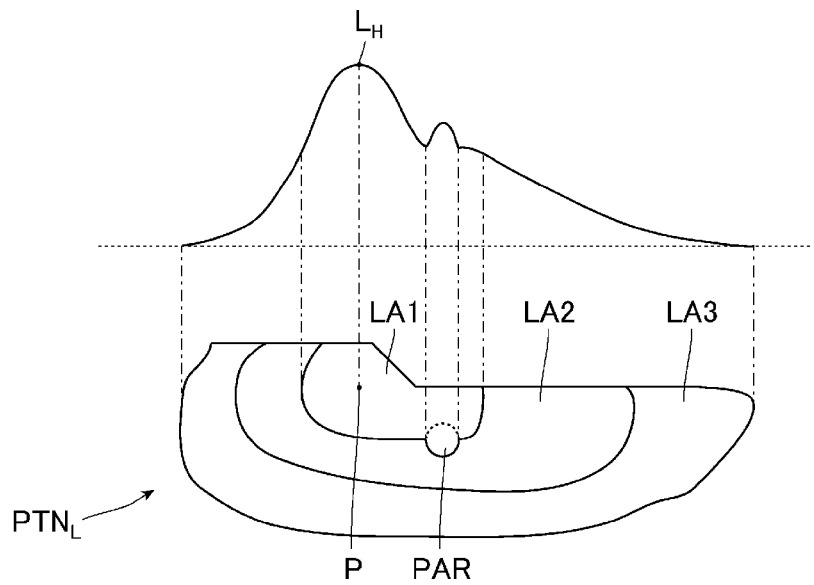
FIG. 14 is a view illustrating a low beam light distribution pattern, and a light intensity distribution of the light distribution pattern in a seventh embodiment of the present disclosure.

FIG. 14 is a view illustrating a low beam light distribution pattern and a light intensity distribution of the light distribution pattern, in the embodiment. As illustrated In FIG. 14, the low beam light distribution pattern $PTN_L$ has a first region LA1, a second region LA2, and a third region LA3, and the light intensity decreases in the order of the first region LA1, the second region LA2, and the third region LA3.

The first region LA1 is a region where the light intensity is higher than a first light intensity threshold in the light intensity distribution of the light obtained by synthesizing the lights DLR, DLG, and DLB as the higher-order diffracted lights. The first region LA1 includes a portion P with the highest light intensity $L_H$, in the light intensity distribution of the light obtained by synthesizing the lights DLR, DLG, and DLB. The second region LA2 is a region where the light intensity is equal to or less than the first light intensity threshold and is higher than a second light intensity threshold set to be lower than the first light intensity threshold, in the light intensity distribution of the light obtained by synthesizing the lights DLR, DLG, and DLB. The third region LA3 is a region where the light intensity is equal to or less than the second light intensity threshold, in the light intensity distribution of the light obtained by synthesizing the lights DLR, DLG, and DLB. The first light intensity threshold is, for example, a half value of the highest light intensity $L_H$ in the light intensity distribution of the light obtained by synthesizing the lights DLR, DLG, and DLB.

In such a low beam light distribution pattern $PTN_L$, a projection region PAR on which the light obtained by synthesizing the zeroth order lights LCR, LCG, and LCB is projected is included within the second region LA2, and overlaps a part of the first region LA1. The light intensity of the projection region PAR is lower than the highest light intensity $L_H$ in the light intensity distribution of the light obtained by synthesizing the lights DLR, DLG, and DLB.

Figure 15:
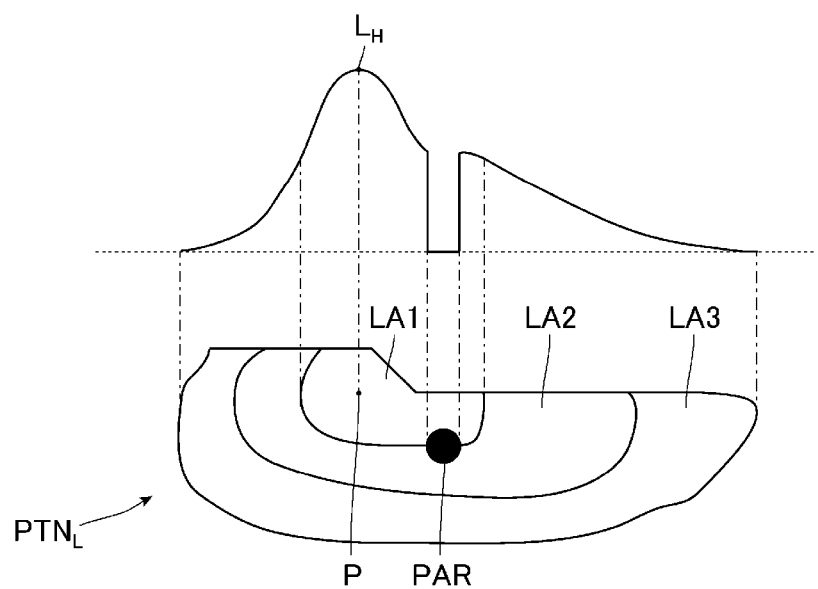
FIG. 15 is a view illustrating a low beam light distribution pattern and a light intensity distribution of the light distribution pattern in a case where zeroth order light is not emitted.

FIG. 15 is a view illustrating a low beam light distribution pattern and a light intensity distribution of the light distribution pattern in a case where zeroth order light is not emitted. As described above, in the embodiment, in the projection region PAR, the light intensity of the light obtained by synthesizing the lights DLR, DLG, and DLB as the higher-order diffracted lights is zero. For this reason, as illustrated in FIG. 15, when the light obtained by synthesizing the zeroth order lights LCR, LCG, and LCB is not emitted, the projection region PAR in the low beam light distribution pattern $PTN_L$ is like a dark hole. By projecting the light obtained by synthesizing the zeroth order lights LCR, LCG, and LCB on the projection region PAR, the low beam light distribution pattern $PTN_L$ illustrated in FIG. 15 is formed. That is, the light intensity of the projection region PAR is the sum of the light intensity of the light obtained by synthesizing the lights DLR, DLG, and DLB and the light intensity of the light obtained by synthesizing the zeroth order lights LCR, LCG, and LCB. In the embodiment, the light intensity of the light obtained by synthesizing the lights DLR, DLG, and DLB in the projection region PAR is zero as described above. For this reason, the light intensity of the projection region PAR is coincident with the light intensity of the light obtained by synthesizing the zeroth order lights LCR, LCG, and LCB.

As described above, the headlight 1 of the embodiment includes the light sources 52R, 52G, and 52B, and the phase modulation elements 54R, 54G, and 54B that diffract lights incident from the light sources 52R, 52G, and 52B with changeable phase modulation patterns.

The low beam light distribution pattern $PTN_L$ based on the phase modulation patterns in the phase modulation elements 54R, 54G, and 54B is formed by the lights DLR, DLG, and DLB diffracted by the phase modulation elements 54R, 54G, and 54, and the zeroth order lights LCR, LCG, and LCB that are emitted from the phase modulation elements without being diffracted by the phase modulation elements 54R, 54G, and 54B. In the light distribution pattern $PTN_L$, in the projection region PAR of the zeroth order light, the light obtained by synthesizing the lights DLR, DLG, and DLB diffracted by the phase modulation elements 54R, 54G, and 54B is not emitted.

Therefore, the light intensity of the light obtained by synthesizing the lights DLR, DLG, and DLB as the higher-order diffracted lights, in the projection region PAR, is lower than the light intensity of the light illuminating the outer edge of the projection region PAR. That is, the phase modulation elements 54R, 54G, and 54B diffract lights incident from the light sources 52R, 52G, and 52B, respectively, such that the light intensity of the lights that are diffracted by the phase modulation elements 54R, 54G, and 54B, and illuminate the projection region PAR is lower than the light intensity of the lights illuminating the outer edge of the projection region PAR. For this reason, even when the projection region PAR is irradiated with the zeroth order light having a higher light intensity than the higher-order diffracted light, it is possible to suppress the projection region PAR from becoming significantly bright in the low beam light distribution pattern $PTN_L$. Therefore, the headlight 1 of the embodiment may allow easy driving as compared to that in a case where the light intensity of the higher-order diffracted light in the projection region PAR is equal to or higher than the light intensity of the light illuminating the outer edge of the projection region PAR.

In the headlight 1 of the embodiment, as in the first embodiment, the phase modulation elements 54R, 54G, and 54B diffract lights emitted from the light sources 52R, 52G, and 52B, respectively, with changeable phase modulation patterns. For this reason, the headlight 1 may change a light distribution pattern of the emitted light. When the phase modulation patterns in the phase modulation elements 54R, 54G, and 54B are changed, the phase modulation elements 54R, 54G, and 54B with the changed phase modulation patterns may diffract lights incident from the light sources 52R, 52G, and 52B, respectively, such that the light intensity of the lights that are diffracted by the phase modulation elements 54R, 54G, and 54B and illuminate the projection region PAR is lower than the light intensity of the lights illuminating the outer edge of the projection region PAR. Accordingly, even when the light distribution pattern of the emitted light is changed, the headlight 1 may allow easy driving.

In the embodiment, the light obtained by synthesizing the lights DLR, DLG, and DLB as the higher-order diffracted lights does not illuminate the projection region PAR as described above. For this reason, in the light obtained by synthesizing the lights DLR, DLG, and DLB as the higher-order diffracted lights, the light intensity of light illuminating the projection region PAR is zero. That is, the phase modulation elements 54R, 54G, and 54B diffract lights incident from the light sources 52R, 52G, and 52B, respectively, such that the light intensity of the lights that are diffracted by the phase modulation elements 54R, 54G, and 54B and illuminate the projection region PAR becomes zero. Therefore, in the embodiment, even when the difference between the light intensity of the zeroth order light and the light intensity of the higher-order diffracted light is large, it is possible to suppress the projection region PAR from becoming significantly bright in the low beam light distribution pattern $PTN_L$, and thus the light intensity distribution of the corresponding light distribution pattern $PTN_L$ easily becomes a smooth light intensity distribution. When phase modulation patterns in the phase modulation elements 54R, 54G, and 54B are changed, the phase modulation elements 54R, 54G, and 54B with the changed phase modulation patterns may diffract lights incident from the light sources 52R, 52G, and 52B, respectively, such that the light intensity of the lights that are diffracted by the phase modulation elements 54R, 54G, and 54B, and illuminate the projection region PAR becomes zero. Accordingly, even when the light distribution pattern of the emitted light is changed, the headlight 1 may suppress the projection region from becoming significantly bright in the changed light distribution pattern. For this reason, the light intensity distribution of the changed light distribution pattern easily becomes a smooth light intensity distribution.

In the embodiment, as described above, in the light obtained by synthesizing the lights DLR, DLG, and DLB as the higher-order diffracted lights, the light intensity of light illuminating the projection region PAR is zero. For this reason, the light intensity of the projection region PAR is the light intensity of the zeroth order light. As illustrated in FIG. 14, the light intensity of the zeroth order light is lower than the highest light intensity $L_H$ in the light intensity distribution of the light obtained by synthesizing the lights DLR, DLG, and DLB as the higher-order diffracted lights. That is, the phase modulation elements 54R, 54G, and 54B diffract lights incident from the light sources 52R, 52G, and 52B, respectively, such that the sum of the light intensity of the lights that are diffracted by the phase modulation elements 54R, 54G, and 54B and illuminate the projection region and the light intensity of zeroth order lights is lower than the highest light intensity $L_H$ in the light intensity distribution of the light obtained by synthesizing the lights diffracted by the phase modulation elements 54R, 54G, and 54B. Therefore, in the embodiment, the light intensity distribution of the light distribution pattern $PTN_L$ easily becomes a smooth light intensity distribution with reference to the portion P with the highest light intensity $L_H$ in the light intensity distribution of the light obtained by synthesizing the lights DLR, DLG, and DLB as the higher-order diffracted lights. When phase modulation patterns are changed in the phase modulation elements 54R, 54G, and 54B, the phase modulation elements 54R, 54G, and 54B with the changed phase modulation patterns may diffract lights incident from the light sources 52R, 52G, and 52B, respectively, such that the sum of the light intensity of the lights that are diffracted by the phase modulation elements 54R, 54G, and 54B and illuminate the projection region and the light intensity of zeroth order lights is lower than the highest light intensity in the light intensity distribution of the light obtained by synthesizing the lights diffracted by the phase modulation elements 54R, 54G, and 54B. Accordingly, in the headlight 1, the light intensity distribution of the changed light distribution pattern easily becomes a smooth light intensity distribution.

In the embodiment, the low beam light distribution pattern $PTN_L$ includes the first region LA1, the second region LA2 in which the light intensity is lower than the light intensity of the first region LA1, and the third region LA3 in which the light intensity is lower than the light intensity of the second region LA2. Then, the projection region PAR is included within the second region LA2, and a part of the corresponding projection region PAR overlaps the first region LA1. That is, the phase modulation elements 54R, 54G, and 54B diffract lights incident from the light sources 52R, 52G, and 52B, respectively, such that the projection region PAR is included within the second region LA2, and a part of the corresponding projection region PAR overlaps the first region LA1. Therefore, as compared to that in a case where the projection region PAR is included in the third region LA3 that is a region with the lowest light intensity in the low beam light distribution pattern $PTN_L$, it is possible to suppress the projection region PAR from becoming significantly bright in the low beam light distribution pattern $PTN_L$. When phase modulation patterns are changed in the phase modulation elements 54R, 54G, and 54B, it is assumed that a light distribution pattern formed by light obtained by synthesizing lights diffracted by the phase modulation elements 54R, 54G, and 54B with the changed phase modulation patterns and zeroth order lights emitted from the phase modulation elements 54R, 54G, and 54B has a first region, a second region in which the light intensity is lower than the light intensity of the first region, and a third region in which the light intensity is lower than the light intensity of the second region. The phase modulation elements 54R, 54G, and 54B may diffract lights incident from the light sources 52R, 52G, and 52B, respectively, such that the projection region is included within the second region, and a part of the corresponding projection region overlaps the first region. Accordingly, it is possible to suppress the projection region from becoming significantly bright in the light distribution pattern formed by the light obtained by synthesizing the lights diffracted by the phase modulation elements 54R, 54G, and 54B with the changed phase modulation patterns and the zeroth order lights emitted from the phase modulation elements 54R, 54G, and 54B.

The headlight 1 of the embodiment includes a plurality of light-emitting optical systems each of which includes one light source and one phase modulation element. That is, the headlight 1 includes the first light-emitting optical system 51R including one light source 52R and one phase modulation element 54R, the second light-emitting optical system 51G including one light source 52G and one phase modulation element 54G, the third light-emitting optical system 51B including one light source 52B and one phase modulation element 54B, and the synthesis optical system 55 that synthesizes lights emitted from the light-emitting optical systems 51R, 51G, and 51B, respectively. The light sources 52R, 52G, and 52B emit lights with mutually different predetermined wavelengths, respectively, and the phase modulation elements 54R, 54G, and 54B emit the lights from the light sources 52R, 52G, and 52B, respectively, such that light obtained through synthesis in the synthesis optical system 55 has the low beam light distribution pattern $PTN_L$. Therefore, in the same manner as in the sixth embodiment, in the headlight 1 of the embodiment, it is possible to suppress the occurrence of color blurring near the edge of the light distribution pattern $PTN_{L\ of\ the}$ emitted low beam.

In the headlight 1 of the embodiment, the zeroth order lights LCR, LCG, and LCB emitted from the phase modulation elements 54R, 54G, and 54B, respectively, are synthesized in the synthesis optical system 55, and projected on the projection region PAR. In this case, even when the phase modulation elements 54R, 54G, and 54B have wavelength dependencies as described above, the zeroth order lights LCR, LCG, and LCB emitted from the phase modulation elements 54R, 54G, and 54B, respectively, may be projected to have the same white color. Therefore, in the headlight 1 of the embodiment, it is possible to suppress a driver from being unnecessarily conscious of the projection region PAR, which may allow easier driving.

Hereinafter, descriptions will be made on modifications of the headlight 1 in the seventh embodiment.

In the seventh embodiment, the first light-emitting optical system 51R, the second light-emitting optical system 51G, and the third light-emitting optical system 51B include reflection-type phase modulation elements 54R, 54G, and 54B, respectively. However, the first light-emitting optical system 51R, the second light-emitting optical system 51G, and the third light-emitting optical system 51B may include transmission-type phase modulation elements 54R, 54G, and 54B, respectively, like the first light-emitting optical system 51R, the second light-emitting optical system 51G, and the third light-emitting optical system 51B in the second embodiment illustrated in FIG. 8.

In the seventh embodiment, the optical system unit 50 includes the synthesis optical system 55. However, the optical system unit 50 may not include the synthesis optical system 55 like the optical system unit 50 of the third embodiment illustrated in FIG. 10.

In the seventh embodiment, the higher-order diffracted lights that are diffracted by the phase modulation elements 54R, 54G, and 54B and emitted from the phase modulation elements 54R, 54G, and 54B do not illuminate the projection region PAR, and thus the light intensity of the higher-order diffracted light is zero in the corresponding projection region PAR. However, as long as the light intensity of the higher-order diffracted light illuminating the projection region PAR is lower than the light intensity of the light illuminating the outer edge of the projection region PAR, the light intensity of the higher-order diffracted light illuminating the corresponding projection region PAR may be larger than zero.

In the seventh embodiment, the zeroth order lights LCR, LCG, and LCB emitted from the phase modulation elements 54R, 54G, and 54B, respectively, may not be synthesized in the synthesis optical system 55, and may illuminate separate regions within the projection region PAR. As described above, in view of suppressing a driver from being unnecessarily conscious of the projection region PAR, it is desirable that the zeroth order lights LCR, LCG, and LCB emitted from the phase modulation elements 54R, 54G, and 54B, respectively, are synthesized in the synthesis optical system 55, and are projected on the projection region PAR.

In the seventh embodiment, the projection region PAR overlaps a part of the first region LA1, but may be included within the corresponding first region LA1. The projection region PAR does not include a position with the highest light intensity $L_H$ in the light intensity distribution of the higher-order diffracted lights, but may include the corresponding position. In this case, the brightest region in the low beam light distribution pattern $PTN_L$ substantially does not change regardless of whether the light intensity of the zeroth order light is high. For this reason, the light intensity distribution of the low beam light distribution pattern $PTN_L$ easily becomes a smoother light intensity distribution with reference to a position with the highest light intensity in the light intensity distribution of the higher-order diffracted lights.

In the seventh embodiment, the light intensity of the projection region PAR is lower than the highest light intensity $L_H$ in the light intensity distribution of the higher-order diffracted lights. However, the light intensity of the projection region PAR may be equal to or higher than the highest light intensity $L_H$ in the light intensity distribution of the higher-order diffracted lights. In this case, it is desirable that the projection region PAR is included within the first region LA1, and it is more desirable that the projection region PAR is included at a position with the highest light intensity $L_H$ in the light intensity distribution of the higher-order diffracted lights.

For example, in the above embodiments, the first light-emitting optical system 51R emitting the first light DLR as a red component, the second light-emitting optical system 51G emitting the second light DLG as a green component, and the third light-emitting optical system 51B emitting the third light DLB as a blue component are included. However, the lights emitted from light sources included in the three light-emitting optical systems, respectively are not limited to red, green, and blue as long as the lights have mutually different predetermined wavelengths.

The number of light-emitting optical systems may be one or two. The number of light-emitting optical systems may be three or more. In this case, for example, a fourth light-emitting optical system that emits light of a yellow component of a low beam may be provided. In this case, besides the above light-emitting optical systems of red, green, and blue, the fourth light-emitting optical system may emit light of a yellow component of a low beam. When the light intensity of a part of red, green, and blue is low, the fourth light-emitting optical system may emit light of the same color component as a color having a low light intensity. Even when there is one light-emitting optical system, a phase modulation element diffracts each light emitted from a light source with a changeable phase modulation pattern. Thus, by changing the phase modulation pattern, it is possible to change a light distribution pattern of light diffracted by the phase modulation element. Therefore, even when a plurality of light diffracting optical elements is not included, such a vehicular lamp may change a light distribution pattern of emitted light, and thus, may be reduced in size as compared to a vehicular lamp including a plurality of light diffracting optical elements like the vehicular headlight described in Japanese Patent Laid-Open Publication No. 2012-146621.

In the above embodiments, a white balance adjusting circuit may be further provided. The white balance adjusting circuit may achieve a desired white balance by controlling the total luminous flux of light emitted from the light source 52R of the first light-emitting optical system 51R, the total luminous flux of light emitted from the light source 52G of the second light-emitting optical system 51G, and the total luminous flux of light emitted from the light source 52B of the third light-emitting optical system 51B. For example, the headlight may be switchable to emit warm-colored white light or to emit blue-colored white light, within the scope of the law.

In the first embodiment, the second embodiment, the fourth embodiment, the sixth embodiment, and the seventh embodiment, the first optical element 55$f$ synthesizes the first light DLR and the second light DLG by transmitting the first light DLR and reflecting the second light DLG, and the second optical element 55$s$ synthesizes the first light DLR, the second light DLG, and the third light DLB by transmitting the first light DLR and the second light DLG synthesized by the first optical element 55$f$ and reflecting the third light DLB. However, for example, a configuration may be employed in which the first optical element 55$f$ synthesizes the third light DLB and the second light DLG, and the second optical element 55$s$ synthesizes the third light DLB and the second light DLG synthesized in the first optical element 55$f$ with the first light DLR. In this case, in the first embodiment and the second embodiment, positions of the first light-emitting optical system 51R including the light source 52R, the collimator lens 53R, and the phase modulation element 54R, and the third light-emitting optical system 51B including the light source 52B, the collimator lens 53B, and the phase modulation element 54B are switched. In the first embodiment and the second embodiment, a band pass filter that transmits light of a predetermined wavelength band, and reflects light of another wavelength band may be used for the first optical element 55$f$ or the second optical element 55$s$. The synthesis optical system 55 only has to superimpose lights emitted from light-emitting optical systems, respectively, on each other, and is not limited to the configuration of the first embodiment and the second embodiment or the above configuration.

Figure 16:
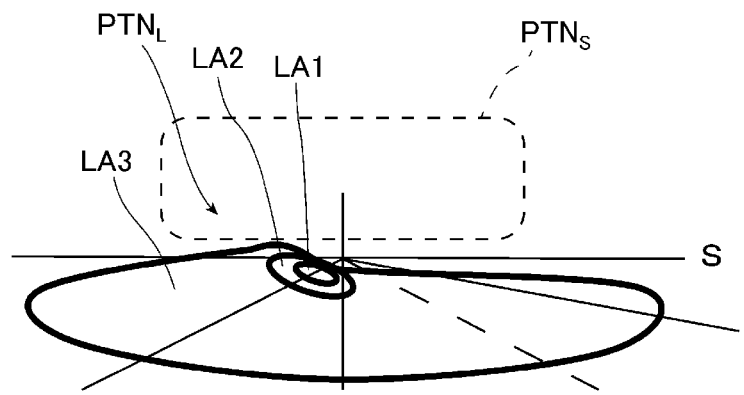
FIG. 16 is a view illustrating a light distribution pattern of a low beam and a light distribution pattern of light for sign visual recognition.

In the above embodiments, the headlight 1 emits a low beam or a high beam. However, a light distribution pattern of light emitted by the headlight is not limited to only a light distribution pattern of a low beam or a high beam as long as the light distribution pattern is a light distribution pattern for dark place illumination. Light of the light distribution pattern for the dark place illumination is emitted at night or in a dark place such as a tunnel. For example, as illustrated in FIG. 16, in some cases, a light distribution pattern $PTN_L$ of a low beam and a light distribution pattern $PTN_S$ of light for sign visual recognition, which is located, for example, above the outside of the light distribution pattern $PTN_L$, are formed as light distribution patterns for dark place illumination. In this case, it is desirable that higher-order diffracted lights diffracted by the phase modulation elements 54R, 54G, and 54B, respectively, include corresponding light for sign visual recognition. A light distribution pattern of emitted light may be continuously changed. Accordingly, a moving image may be drawn on a road surface, etc.

In the above embodiments, the phase modulation elements 54R, 54G, and 54B each of which has a plurality of modulation units have been described as an example. However, the number, the size, the outer shape, etc. of the modulation units are not particularly limited. For example, the phase modulation element may include one modulation unit, and cause the one modulation unit to diffract incident light.

In the above embodiments, the phase modulation elements 54R, 54G, and 54B are reflection-type phase modulation elements or transmission-type phase modulation elements. However, the phase modulation element only has to diffract and emit incident light with a changeable phase modulation pattern, to make a light distribution pattern of the emitted light a desired light distribution pattern. For example, the phase modulation element may be a grating light valve (GLV) in which a plurality of reflectors is formed on a silicon substrate. The GLV is a reflection-type phase modulation element, which diffracts and emits incident light by electrically controlling deflection of the reflectors so as to make a light distribution pattern of the emitted light a predetermined light distribution pattern.

In the above embodiments, a headlight for an automobile has been exemplified as a vehicular lamp. However, the vehicular lamp may be a headlight for another vehicle as well as the headlight for the automobile, and may be a lamp such as a rear lamp, a tail light, a brake light, an indicating lamp, a road surface drawing device that draws an image on a road surface, etc. as well as the headlight.

In short, the present disclosure exemplified in the first embodiment, the second embodiment, and the third embodiment may be the following vehicular lamp. The vehicular lamp includes a light source, and a phase modulation element that diffracts light incident from the light source with a changeable phase modulation pattern. The light diffracted by the phase modulation element is emitted with a predetermined light distribution pattern based on the phase modulation pattern, and a projection region on which zeroth order light, that is emitted from the corresponding phase modulation element without being diffracted by the phase modulation element, in the light incident on the corresponding phase modulation element, is projected is located within a range where a driver's view of a vehicle is obstructed by the vehicle. Such a vehicular lamp may be reduced in size and may allow easy driving.

The present disclosure exemplified in the fourth embodiment and the fifth embodiment may be the following vehicular lamp. The vehicular lamp includes a light source, a phase modulation element that diffracts light incident from the light source with a changeable phase modulation pattern, and an optical element that reduces the energy density of the light. The optical element is disposed on an optical path of zeroth order light, that is emitted from the phase modulation element without being diffracted by the phase modulation element, in the light incident on the phase modulation element, between a projection region on which the zeroth order light is projected and the phase modulation element. The light diffracted by the phase modulation element is emitted with a predetermined light distribution pattern based on the phase modulation pattern. Such a vehicular lamp may be reduced in size and may allow easy driving.

The present disclosure exemplified in the sixth embodiment may be the following vehicular lamp. The vehicular lamp includes a light source, and a phase modulation element that diffracts light incident from the light source with a changeable phase modulation pattern. A light distribution pattern having a predetermined light intensity distribution based on the phase modulation pattern is formed by the light diffracted by the phase modulation element, and zeroth order light that is emitted from the phase modulation element without being diffracted by the phase modulation element. A projection region on which the zeroth order light is projected is located within a region where the light intensity is higher than half the highest light intensity in the light intensity distribution of the light diffracted by the phase modulation element, in the light distribution pattern. Such a vehicular lamp may be reduced in size and may allow easy driving.

The present disclosure exemplified in the seventh embodiment may be the following vehicular lamp. That is, the vehicular lamp includes a light source, and a phase modulation element that diffracts light incident from the light source with a changeable phase modulation pattern. A light distribution pattern having a predetermined light intensity distribution based on the phase modulation pattern is formed by the light diffracted by the phase modulation element, and zeroth order light that is emitted from the phase modulation element without being diffracted by the phase modulation element. In a projection region on which the zeroth order light is projected in the light distribution pattern, the light intensity of the light that is diffracted by the phase modulation element and illuminates the projection region is lower than the light intensity of the light that illuminates the outer edge of the projection region. Such a vehicular lamp may be reduced in size and may allow easy driving.

According to the present disclosure, there is provided a vehicular lamp that is reduced in size and allows easy driving, which is usable in the field, etc. of lamps of vehicles such as an automobile.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicular lamp comprising:
a light source; and
a phase modulator configured to diffract a light beam incident from the light source with a changeable phase modulation pattern,
wherein the light beam diffracted by the phase modulator is emitted with a predetermined light distribution pattern based on the phase modulation pattern, and
a projection region on which, in the light beam incident on the phase modulator, zeroth order light beam emitted from the phase modulator without being diffracted by the phase modulator is projected, is located within a range where a driver's view of a vehicle is obstructed by the vehicle.

2. The vehicular lamp according to claim 1, wherein the predetermined light distribution pattern has a light intensity distribution.

3. The vehicular lamp according to claim 2, further comprising:
- a plurality of light-emitting optical systems each including one light source and one phase modulation element; and
- an optical synthesizer configured to synthesize light beams emitted from the light-emitting optical systems, respectively,
- wherein the light sources in the light-emitting optical systems emit light beams with mutually different predetermined wavelengths, respectively, and
- the phase modulators in the light-emitting optical systems diffract the light beams from the light sources, respectively, such that a light beam obtained through synthesis in the optical synthesizer has the predetermined light distribution pattern.

4. The vehicular lamp according to claim 3, wherein zeroth order light beams emitted from the phase modulators in the light-emitting optical systems, respectively, are synthesized in the optical synthesizer and projected on the projection region.

5. The vehicular lamp according to claim 1, further comprising:
- a plurality of light-emitting optical systems each including one light source and one phase modulator; and
- an optical synthesizer configured to synthesize light beams emitted from the light-emitting optical systems, respectively,
- wherein light sources in the light-emitting optical systems emit light beams with mutually different predetermined wavelengths, respectively, and
- phase modulators in the light-emitting optical systems diffract the light beams from the light sources, respectively, such that a light beam obtained through synthesis in the optical synthesizer has the predetermined light distribution pattern.

6. The vehicular lamp according to claim 5, wherein zeroth order light beams emitted from the phase modulators in the light-emitting optical systems, respectively, are synthesized in the synthesis optical system and projected on the projection region.

* * * * *